United States Patent
Zhamu et al.

(10) Patent No.: US 11,037,738 B2
(45) Date of Patent: Jun. 15, 2021

(54) HYBRID SUPERCAPACITOR CONTAINING A NIOBIUM COMPOSITE METAL OXIDE AS AN ANODE ACTIVE MATERIAL

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Nanotek Instruments Group, LLC, Dayton, OH (US)

(*) Notice: Subject to any disclaimer, the term of this patent is extended or adjusted under 35 U.S.C. 154(b) by 133 days.

(21) Appl. No.: 15/895,456

(22) Filed: Feb. 13, 2018

(65) Prior Publication Data
US 2019/0252131 A1    Aug. 15, 2019

(51) Int. Cl.
| | |
|---|---|
| *H01G 11/46* | (2013.01) |
| *H01G 11/36* | (2013.01) |
| *H01G 11/50* | (2013.01) |
| *H01G 11/86* | (2013.01) |
| *H01G 11/06* | (2013.01) |
| *H01G 11/24* | (2013.01) |
| *H01M 4/36* | (2006.01) |
| *H01M 4/587* | (2010.01) |
| *H01M 10/0525* | (2010.01) |
| *H01M 4/485* | (2010.01) |

(52) U.S. Cl.
CPC ............ *H01G 11/46* (2013.01); *H01G 11/06* (2013.01); *H01G 11/24* (2013.01); *H01G 11/36* (2013.01); *H01G 11/50* (2013.01); *H01G 11/86* (2013.01); *H01M 4/364* (2013.01); *H01M 4/485* (2013.01); *H01M 4/587* (2013.01); *H01M 10/0525* (2013.01); *H01M 2220/20* (2013.01)

(58) Field of Classification Search
CPC ................................ H01G 11/36; H01G 11/52
See application file for complete search history.

(56) References Cited

U.S. PATENT DOCUMENTS

| | | |
|---|---|---|
| 2,798,878 A | 7/1957 | Hummers |
| 8,647,773 B2 | 2/2014 | Goodenough et al. |

(Continued)

FOREIGN PATENT DOCUMENTS

CN    105575675 A    5/2016

OTHER PUBLICATIONS

Jiao et al., "Boosting long-cycle-life energy storage with holey graphene supported TiNb2O7 network nanostructure for lithium ion hybrid supercapacitors", (Sep. 2018), Journal of Power Sources, 403 (2018), 66-75.*

(Continued)

*Primary Examiner* — Eric W Thomas

(57) ABSTRACT

A graphene-enabled hybrid particulate for use as an anode active material in a hybrid supercapacitor or lithium-ion capacitor, wherein the hybrid particulate is formed of a single or a plurality of graphene sheets and a single or a plurality of fine primary particles of a niobium-containing composite metal oxide, having a size from 1 nm to 10 μm, and the graphene sheets and the primary particles are mutually bonded or agglomerated into the hybrid particulate containing an exterior graphene sheet or multiple exterior graphene sheets embracing the primary particles, and wherein the hybrid particulate has an electrical conductivity no less than $10^{-4}$ S/cm and said graphene is in an amount of from 0.01% to 30% by weight based on the total weight of graphene and the niobium-containing composite metal oxide combined.

20 Claims, 7 Drawing Sheets

(56) References Cited

U.S. PATENT DOCUMENTS

| | | |
|---|---|---|
| 9,136,532 B2 | 9/2015 | Harada et al. |
| 9,240,590 B2 | 1/2016 | Harada et al. |
| 9,240,591 B2 | 1/2016 | Inagaki et al. |
| 9,325,002 B2 | 4/2016 | Inagaki et al. |
| 9,373,841 B2 | 6/2016 | Yoshima et al. |
| 9,431,657 B2 | 8/2016 | Inagaki et al. |
| 9,437,372 B1 | 9/2016 | Zhamu et al. |
| 9,515,319 B2 | 12/2016 | Harada et al. |
| 9,698,417 B2 | 7/2017 | Buannic et al. |
| 9,774,032 B2 | 9/2017 | Inagaki et al. |
| 9,806,338 B2 | 10/2017 | Dai et al. |
| 9,806,339 B2 | 10/2017 | Nakahara et al. |
| 2008/0279756 A1 | 11/2008 | Zhamu et al. |
| 2015/0056514 A1 | 2/2015 | Dai et al. |
| 2015/0364757 A1 | 12/2015 | Buannic et al. |
| 2017/0194105 A1 | 7/2017 | Zhamu et al. |
| 2019/0103231 A1 | 4/2019 | Chai et al. |

OTHER PUBLICATIONS

Wang et al., Intercalation pseudo-capacitive $TiNb_2O_7$@carbon electrode for high-performance lithium ion hybrid electrochemical supercapacitors with ultrahigh energy density, Nano Energy (2015), 15, pp. 104-115 (Year: 2015).*

Guo et al., "A long-life lithium-ion battery with a highly porous $TiNb_2O_7$ anode for large-scale electrical energy storage" Energy Environ. Sci. (2014) vol. 7, pp. 2220-2226.

Jayaraman et al., "Exceptional Performance of $TiNb_2O_7$ Anode in All One-Dimensional Architecture by Electrospinning" ACS Appl. Mater. Interfaces (2014) vol. 6, No. 11, pp. 8660-8666.

Karlicky et al., "Halogenated Graphenes: Rapidly Growing Family of Graphene Derivatives" ACS Nano (2013) vol. 7, No. 8, pp. 6434-6464.

Lin et al., "Nano-$TiNb_2O_7$/carbon nanotubes composite anode for enhanced lithium-ion storage" Electrochimica Acta (2018) vol. 260, pp. 65-72.

Lou et al., "Facile synthesis of nanostructured $TiNb_2O_7$ anode materials with superior performance for high-rate lithium ion batteries" Chem Commun (Camb) (2015) vol. 51, No. 97, pp. 17293-17296.

Park et al., "Porosity-Controlled $TiNb_2O_7$ Microspheres with Partial Nitridation as a Practical Negative Electrode for High-Power Lithium-Ion Batteries" Adv. Energy Mater. (2015) vol. 5, p. 1401945 (7 pages).

PCT/US18/59173 International Search Report and Written Opinion dated Aug. 5, 2019, 7 pages.

* cited by examiner

HYBRID SUPERCAPACITOR CONTAINING A NIOBIUM COMPOSITE METAL OXIDE AS AN ANODE ACTIVE MATERIAL

FIELD OF THE INVENTION

The present disclosure relates generally to the field of supercapacitors and, in particular, to a hybrid supercapacitor featuring a graphene-enabled or graphene-enhanced anode containing a composite niobium-transition metal oxide.

BACKGROUND OF THE INVENTION

Supercapacitors (Ultra-Capacitors or Electro-Chemical Capacitors):

A supercapacitor normally depends on porous carbon electrodes to create a large surface area conducive to the formation of diffuse electric double layer (EDL) charges. The ionic species (cations and anions) in the EDL zones are formed in the electrolyte near an electrode surface when voltage is imposed upon a symmetric supercapacitor (or EDLC). The required ions for this EDL mechanism pre-exist in the liquid electrolyte (randomly distributed in the electrolyte) when the cell is made or in a discharged state.

When the supercapacitor is re-charged, the ions (both cations and anions) already pre-existing in the liquid electrolyte are formed into EDLs near their respective local electrodes. There is no exchange of ions between an anode active material and a cathode active material. The amount of charges that can be stored (capacitance) is dictated solely by the concentrations of cations and anions that pre-exist in the electrolyte. These concentrations are typically very low and are limited by the solubility of a salt in a solvent, resulting in a low energy density.

Since the formation of EDLs does not involve a chemical reaction or an exchange of ions between the two opposite electrodes, the charge or discharge process of an EDL supercapacitor can be very fast, typically in seconds, resulting in a very high power density (more typically 3,000-8,000 W/Kg). Compared with batteries, supercapacitors offer a higher power density, require no maintenance, offer a much higher cycle-life, require a very simple charging circuit, and are generally much safer. Physical, rather than chemical, energy storage is the key reason for their safe operation and extraordinarily high cycle-life.

Another type of supercapacitor is a pseudocapacitor that stores electrical energy by means of reversible faradaic redox reactions on the surface of suitable carbon electrodes. Such an electrode typically is composed of a carbon material (e.g. activated carbon) and a transition metal oxide (or a conjugate polymer), which together form a redox pair. Pseudocapacitance is typically accompanied with an electron charge-transfer between electrolyte and electrode arising from a de-solvated and adsorbed ion whereby only one electron per charge unit participates. This faradaic charge transfer originates from a very fast sequence of reversible redox, intercalation or electrosorption processes. The adsorbed ion has no chemical reaction with the atoms of the electrode (no chemical bonding) since only a charge-transfer occurs.

Despite the positive attributes of supercapacitors, there are several technological barriers to widespread implementation of supercapacitors for various industrial applications. For instance, EDLC supercapacitors possess very low energy densities when compared to batteries (e.g., 5-8 Wh/kg for commercial supercapacitors vs. 20-40 Wh/kg for the lead acid battery and 50-100 Wh/kg for the NiMH battery). Although a pseudocapacitor can exhibit a higher specific capacitance or energy density relative to the EDLC, the energy density per cell is typically lower than 20 Wh/kg. The conventional pseudocapacitor also suffers from a poor cycle life. Lithium-ion batteries possess a much higher energy density, typically in the range of 150-220 Wh/kg, based on the total cell weight.

Lithium-Ion Batteries (LIB):

Although possessing a much higher energy density, lithium-ion batteries deliver a very low power density (typically 100-500 W/Kg), requiring typically hours for re-charge. Conventional lithium-ion batteries also pose some safety concern.

The low power density or long re-charge time of a lithium ion battery is due to the mechanism of shuttling lithium ions between the interior of an anode and the interior of a cathode. During recharge, lithium atoms must diffuse out of a cathode active material (e.g. particles of $LiCoO_2$), migrate through an electrolyte phase, and enters or intercalates into the bulk of an anode active material particles (e.g. graphite particles). Most of these lithium ions have to come all the way from the cathode side by diffusing out of the bulk of a cathode active particle, through the pores of a solid separator (pores being filled with a liquid electrolyte), and into the bulk of a graphite particle at the anode.

During discharge, lithium ions diffuse out of the anode active material (e.g. de-intercalate out of graphite particles 10 μm in diameter), migrate through the liquid electrolyte phase, and then diffuse into the bulk of complex cathode crystals (e.g. intercalate into particles lithium cobalt oxide, lithium iron phosphate, or other lithium insertion compound). Because the liquid electrolyte only reaches the external surface (not interior) of a solid particle (e.g. graphite particle), lithium ions swimming in the liquid electrolyte can only migrate (via fast liquid-state diffusion) to the surface of a graphite particle. To penetrate into the bulk of a solid graphite particle would require a slow solid-state diffusion (commonly referred to as "intercalation") of lithium ions. The diffusion coefficients of lithium in solid particles of lithium metal oxide are relatively low; e.g. typically $10^{-16}$-$10^{-8}$ $cm^2$/sec (more typically $10^{-14}$-$10^{-10}$ $cm^2$/sec), although those of lithium in liquid are approximately $10^{-6}$ $cm^2$/sec.

As such, these intercalation or solid-state diffusion processes require a long time to accomplish because solid-state diffusion (or diffusion inside a solid) is difficult and slow. This is why, for instance, the current lithium-ion battery for plug-in hybrid vehicles requires 2-7 hours of recharge time, as opposed to just seconds for supercapacitors. The above discussion suggests that an energy storage device that is capable of storing as much energy as in a battery and yet can be fully recharged in one or two minutes like a supercapacitor would be considered a revolutionary advancement in energy storage technology.

Conventional lithium-ion batteries generally make use of an anode (negative electrode) active material (e.g. graphite and hard carbon particles) that has an electrochemical potential poorly matched to the potential level at which the electrolyte is reduced, which results in a lower capacity and may introduce an internal short-circuit that sets the electrolyte on fire unless charging rates are controlled.

Conventional lithium-ion batteries are designed so that the electrolyte has an electrochemical potential window between its LUMO (lowest unoccupied molecular orbital) and HOMO (highest occupied molecular orbital). This window is typically between 1.1 and 4.3 eV below the Fermi energy (electrochemical potential) of elemental Lithium.

Conventional lithium-ion batteries also have an open-circuit voltage described by the equation: $V_{OC}=(E_{FA}-E_{FC})/e$ where $E_{FA}$ is the Fermi energy of the anode, $E_{FC}$ is the Fermi energy of the cathode, and e is the magnitude of the charge of an electron. If $E_{FA}$ lies above the LUMO energy level of the electrolyte, the electrolyte will be reduced during the battery operation unless a passivation layer forms on the anode material surface. Such a solid-electrolyte interphase (SEI) passivation layer contains elemental Lithium ($Li^0$) in order not to block the transfer of lithium ions through the SEI.

When a lithium-ion battery is charged, lithium ions are transferred from the electrolyte to the anode. Electrons ($e^-$) are also concurrently transferred to the anode from an external circuit. Higher voltages can be used to charge batteries more quickly, but if the fast-charging voltage raises the energy of the incoming electrons above the Fermi energy (electrochemical potential) of metallic lithium, the lithium ions will inhomogeneously plate out of the electrolyte onto the anode as elemental Lithium. Consequently, the anode can develop a mossy surface and, eventually, a lithium dendrite can grow through the electrolyte to the cathode, causing internal shorting and possibly a fire and explosion.

To prevent such shorting issues, carbon/graphite is typically used as the anode active material into which lithium ions are reversibly inserted. Insertion of lithium ions into carbon/graphite is a two phase reaction from C to $LiC_6$ and provides a voltage plateau of approximately 0.2 V versus $Li^+/Li^0$. However, the electrochemical potential of reduced carbon/graphite is above the electrolyte LUMO and thus carbon/graphite anodes form a passivating SEI layer. This layer increases the impedance of the anode, consumes some amount of lithium irreversibly from the cathode on the initial charge, and limits the charging voltage (thus, the charging rate). If the cell is charged too rapidly (typically at a voltage of 1.0 V versus) $Li^+/Li^0$, lithium ions are not able to traverse the SEI layer before they are plated out on the surface of the SEI layer as elemental Lithium. This problem limits the charging rate of a battery and may require additional protective circuitry against internal shorting. In addition, the capacity of the cathode normally limits the capacity of a cell, and the entrapment of lithium in the anode SEI layer during charge can reduce the capacity of the cathode and the amount of energy stored in the cell.

An alternative anode active material is the spinel $Li_4Ti_5O_{12}$, which operates on the Ti(IV)/Ti(III) redox couple located at 1.5 V versus $Li^+/Li^0$. This anode material is capable of a fast charge and a long cycle life due to no SEI layer formation and minimal volume changes during repeated charges/discharges. However, the material has a low specific capacity (theoretically 175 mAh/g and practically 120-150 mAh/g). In comparison with a carbon/graphite anode material (theoretically 372 mAh/g and practically 320-360 mAh/g; having an intercalation/desorbing potential at 0.2 V versus $Li^+/Li^0$), the $Li_4Ti_5O_{12}$ material suffers a voltage loss of 1.3 V (=1.5V−0.2 V) and a capacity reduction of approximately 200 mAh/g, resulting in a significantly lower energy density of a battery using such a titanium oxide-based anode.

Therefore, there is a need for an anode material having a higher capacity than $Li_4Ti_5O_{12}$ and having a voltage in the range of 1.1V-1.5 V versus $Li^+/Li^0$. In response to this need, new electrode materials containing Nb oxide have been examined and some of these materials are found to have a high charging and discharging capacity. For instance, a titanium-niobium composite oxide represented by a general formula $TiNb_2O_7$ has a high theoretical capacity that exceeds 300 mAh/g. Previous work on Nb-based composite metal oxide may be found in the following references:

1. L. Buannic, et al. U.S. Pat. No. 9,698,417 (Jul. 4, 2017).
2. Y. Harada, et al. U.S. Pat. No. 9,240,590 (Jan. 19, 2016);
   Y. Harada, et al. U.S. Pat. No. 9,515,319 (Dec. 6, 2016);
   Y. Harada, et al. U.S. Pat. No. 9,136,532 (Sep. 15, 2015).
3. H. Inagaki, et al. U.S. Pat. No. 9,240,591 (Jan. 19, 2016);
   H. Inagaki, et al. U.S. Pat. No. 9,774,032 (Sep. 26, 2017);
   H. Inagaki, et al. U.S. Pat. No. 9,325,002 (Apr. 26, 2016);
   H. Inagaki, et al. U.S. Pat. No. 9,431,657 (Aug. 30, 2016).
4. S. Dai, et al. U.S. Pat. No. 9,806,338 (Oct. 31, 2017).
5. J. B. Goodenough, et al. U.S. Pat. No. 8,647,773 (Feb. 11, 2014).
6. K. Yoshima, et al. U.S. Pat. No. 9,373,841 (Jun. 21, 2016).
7. K. Nakahara, et al. U.S. Pat. No. 9,806,339 (Oct. 31, 2017).
8. Sundaramurthy Jayaraman, et al., "Exceptional Performance of $TiNb_2O_7$ Anode in All One-Dimensional Architecture by Electrospinning," ACS Appl. Mater. Interfaces, 2014, 6 (11), pp 8660-8666.
9. Bingkun Guo, et al., "A long-life lithium-ion battery with a highly porous $TiNb_2O_7$ anode for large-scale electrical energy storage," Energy Environ. Sci., 2014, 7, 2220-2226.
10. Chunfu Lin, et al, "Nano-$TiNb_2O_7$/carbon nanotubes composite anode for enhanced lithium-ion storage," Electrochimica Acta, Volume 260, 10 Jan. 2018, Pages 65-72
11. S. Lou, et al. "Facile synthesis of nanostructured $TiNb_2O_7$ anode materials with superior performance for high-rate lithium ion batteries," Chem Commun (Camb). 2015 Dec. 18; 51(97):17293-6.
12. Hyunjung Park, et al., "Porosity-Controlled $TiNb_2O_7$ Microspheres with Partial Nitridation as A Practical Negative Electrode for High-Power Lithium-Ion Batteries," Advanced Energy Materials, Volume 5, Issue 8, Apr. 22, 2015, 1401945.

However, for all known transition metal oxides operating with a potential of about 1.1-1.5 V vs. $Li^+/Li^0$, it has been found difficult to form a stable film and decomposition of the electrolyte continues to occur on the electrode active material or electrode surface when the battery undergoes repeated charges/discharges. All these Nb-based composite metal oxide compositions fall short in terms of reaching their theoretical lithium ion storage capacities and having a long cycle life.

Clearly, an urgent need exists for an effective approach to protecting niobium-containing composite metal oxide-based anode active materials that operate at a voltage in the range of 1.1V-1.5 V versus $Li^+/Li^0$ with minimal repeated loss of capacity due to electrolyte decomposition and repeated SEI formation. Such an approach provides a high active material utilization rate, high specific capacity at both high and low charge/discharge rates (not just at a low rate), high rate capability, long cycle-life, and improved heat dissipation generated during a battery operation.

Lithium Ion Capacitors (LIC):

A hybrid energy storage device that is developed for the purpose of combining some features of an EDL supercapacitor (or symmetric supercapacitor) and those of a lithium-ion battery (LIB) is a lithium-ion capacitor (LIC). A LIC contains a lithium intercalation compound (e.g., graphite particles) as an anode and an EDL capacitor-type cathode (e.g. activated carbon, AC). In a commonly used LIC, $LiPF_6$ is used as an electrolyte salt, which is dissolved in a solvent, such as propylene carbonate. When the LIC is in a charged state, lithium ions are retained in the interior of the lithium intercalation compound anode (i.e. micron-scaled graphite particles) and their counter-ions (e.g. negatively charged $PF_6^-$) are disposed near activated carbon surfaces.

When the LIC is discharged, lithium ions migrate out from the interior of graphite particles (a slow solid-state diffusion process) to enter the electrolyte phase and, concurrently, the counter-ions $PF_6^-$ are also released from the EDL zone, moving further away from AC surfaces into the bulk of the electrolyte. In other words, both the cations ($Li^+$ ions) and the anions ($PF_6^-$) are randomly disposed in the liquid electrolyte, not associated with any electrode. This implies that the amounts of both the cations and the anions that dictate the specific capacitance of a LIC are essentially limited by the solubility limit of the lithium salt in a solvent (i.e. limited by the amount of $LiPF_6$ that can be dissolved in the solvent) and the surface area of activated carbon in the cathode. Therefore, the energy density of LICs (a maximum of 14 Wh/kg) is not much higher than that (6 Wh/kg) of an EDLC (symmetric supercapacitor), and remains an order of magnitude lower than that (most typically 150-220 Wh/kg) of a LIB.

Furthermore, due to the need to undergo de-intercalation and intercalation at the anode, the power density of a LIC is not high (typically <12 kW/kg, which is comparable to or only slightly higher than those of an EDLC).

The above review of the prior art indicates that a battery has a higher energy density, but is incapable of delivering a high power (high currents or pulsed power) that an EV, HEV, or micro-EV would need for start-stop and accelerating. A battery alone is also not capable of capturing and storing the braking energy of a vehicle. A supercapacitor or LIC can deliver a higher power, but does not store much energy (the stored energy only lasts for a short duration of operating time) and, hence, cannot be a single power source alone to meet the energy/power needs of an EV or HEV. Thus, there is an urgent need for an electrochemical energy storage device that delivers both a high energy density and a high power density.

SUMMARY OF THE INVENTION

This disclosure provides a graphene-enhanced or graphene-enabled hybrid particulate for use as a hybrid supercapacitor anode active material. The particulate is formed of a single or a plurality of graphene sheets and a plurality of fine anode active material particles (primary particles) with a size smaller than 10 µm (preferably smaller than 1 µm, further preferably <100 nm, and most preferably <10 nm). These primary particles include a material selected from a niobium-containing composite metal oxide. The graphene sheets and the primary particles are mutually bonded or agglomerated into the hybrid particulate (also referred to as a secondary particle) with at least a graphene sheet embracing the cathode active material particles. The particulates have an electrical conductivity no less than $10^{-4}$ S/cm (typically and preferably greater than $10^{-2}$ S/cm). The graphene component is in an amount of from 0.01% to 30% by weight (preferably from 0.1% to 20% by weight and more preferably between 0.5% and 10%) based on the total weight of graphene and the niobium-containing composite metal oxide combined. Preferably, the particulate is approximately spherical in shape. Preferably, the hybrid particulate further contains interior graphene sheets in physical contact with the fine anode active material particles and the exterior graphene sheet(s).

The niobium-containing composite metal oxide may be selected from the group consisting of $TiNb_2O_7$, $Li_xTiNb_2O_7$ ($0 \leq x \leq 5$), $Li_xM_{(1-y)}Nb_yNb_2O_{(7+\delta)}$ (wherein $0 \leq x \leq 6$, $0 \leq y \leq 1$, $-1 \leq \delta \leq 1$, and M=Ti or Zr), $Ti_xNb_yO_7$ ($0.5 \leq y/x < 2.0$), $TiNb_xO_{(2+5x/2)}$ ($1.9 \leq x < 2.0$), $M_xTi_{(1-2x)}Nb_{(2+x)}O_{(7+\delta)}$ (wherein $0 \leq x \leq 0.2$, $-0.3 \leq \delta \leq 0.3$, and M=a trivalent metal selected from Fe, Ga, Mo, Ta, V, Al, B, and a mixture thereof), $M_xTi_{(2-2x)}Nb_{(10+x)}O_{(29+\delta)}$ (wherein $0 \leq x \leq 0.4$, $-0.3 \leq \delta \leq 0.3$, and M=a trivalent metal selected from Fe, Ga, Mo, Al, B, and a mixture thereof), $M_xTiNb_2O_7$ (x<0.5, and M=B, Na, Mg, Al, Si, S, P, K, Ca, Mo, W, Cr, Mn, Co, Ni, and Fe), $TiNb_{2-x}Ta_xO_y$ ($0 \leq x < 2$, $7 \leq y \leq 10$), $Ti_2Nb_{10-v}Ta_vO_w$ ($0 \leq v < 2$, $27 \leq y \leq 29$), $Li_xTi_{(1-y)}M1_yNb_{(2-z)}M2_zO_{(7+\delta)}$ (wherein $0 \leq x \leq 5$, $0 \leq y \leq 1$, $0 \leq z \leq 2$, $-0.3 \leq \delta \leq 0.3$, M1=Zr, Si, and Sn, and M2=V, Ta, and Bi), P-doped versions thereof, B-doped versions thereof, carbon-coated versions thereof, and combinations thereof. In such a niobium-containing composite metal oxide, niobium oxide typically forms the main framework or backbone of the crystal structure, along with at least a transition metal oxide.

The graphene sheets used in the hybrid particulate preferably comprise single-layer graphene or few-layer graphene, wherein the few-layer graphene is defined as a graphene platelet formed of less than 10 graphene planes. The graphene sheets are selected from pristine graphene, graphene oxide (GO), reduced graphene oxide (RGO), graphene fluoride, graphene chloride, nitrogenated graphene, hydrogenated graphene, doped graphene, or functionalized graphene The anode active material particles of a niobium-containing composite metal oxide (the "primary particles") in the hybrid particulate (secondary particle) preferably have a dimension smaller than 1 µm, further preferably smaller than 100 nm, and most preferably smaller than 10 nm (e.g. from 1 nm to 10 nm). Smaller dimensions promote shorter lithium diffusion times and faster battery charge and discharge rates. The secondary particles typically have a diameter from 100 nm to 100 µm (preferably from 1 to 20 µm).

This class of anode active materials is relatively safe and enables fast charging and, thus, is a preferred class of anode active materials in the lithium ion batteries for electric vehicle applications.

Optionally, the hybrid particulate further comprises a carbon material in electronic contact with the anode active material and a graphene sheet. This carbon material can be a polymeric carbon, amorphous carbon, chemical vapor deposition (CVD) carbon, carbon black (CB), acetylene black (AB), activated carbon, fine expanded graphite particle with a dimension smaller than 100 nm, artificial graphite particle, and/or natural graphite particle. Preferably, the carbon material is coated on at least one of the anode active material particles and more preferably on the surface of all primary particles, which are then embraced by a graphene sheet or a plurality of graphene sheets.

Preferably, the anode active material particles in the hybrid particulate contain niobium-containing composite metal oxide particles in a nanowire, nanotube, nanodisc, nanoribbon, nanobelt, or nanoplatelet form have a diameter or thickness smaller than 100 nm (preferably from 1 nm to 10 nm).

In certain embodiments, the disclosed process provides a graphene-enabled hybrid material for use as a lithium battery anode active material. The hybrid material contains one or a plurality of graphene sheets and a single or a plurality of fine anode active material particles that are bonded to a surface of the graphene sheets; wherein the anode active material particles have a size smaller than 10 µm (preferably <1 µm, more preferably <100 nm, and most preferably <10 nm) and contain a niobium-containing composite metal oxide, and the graphene is in an amount of from 0.01% to 30% by weight based on the total weight of the hybrid material.

Preferably, these primary particles are nucleated from graphene surfaces and are chemically bonded to graphene surfaces. Preferably, the niobium-containing composite metal oxide particles are in a nanowire, nanotube, nanodisc, nanoribbon, nanobelt, or nanoplatelet form having a diameter or thickness smaller than 100 nm (preferably from 1 nm to 10 nm).

Another preferred embodiment of the present disclosure is a process for producing the aforementioned graphene-enhanced hybrid particulate. In certain embodiments, the process comprises (a) preparing a precursor mixture of graphene or graphene precursor with an anode active material (e.g. niobium-containing composite metal oxide) or anode active material precursor species (e.g. $Nb_2O_5$ and $TiO_2$); (b) dispensing the precursor mixture into secondary particles (particulates); and (c) thermally and/or chemically converting the precursor mixture particulates to the graphene-enhanced hybrid particulates.

As an example, powders of $Nb_2O_5$ and $TiO_2$ are mixed in a molar ratio of 1:1 (i.e. Nb:Ti=2:1) in a mortar. A desired amount of graphene sheets may be added into powders of $Nb_2O_5$ and $TiO_2$ to form a multi-component mixture in a mortar. The mixture is then calcined in a furnace and sintered at 1,250° C. for 20 hours. The presence of some graphene sheets during the sintering process is found to produce more uniform and larger numbers of smaller crystals of the resulting niobium-containing composite metal oxide.

The step of preparing a precursor mixture preferably comprises preparing a suspension of graphene or graphene precursor in a liquid medium and mixing an anode active material or active material precursor species in the suspension to form a multi-component suspension. The process preferably further comprises a step of drying the multi-component suspension to form the precursor mixture. If this drying process includes using a spray-drying, spray-pyrolysis, ultrasonic-spraying, or fluidized-bed drying procedure, the dried mixture is in a form of the hybrid particulate having graphene sheets wrapping around clusters of primary particles. This drying step is typically followed by a step of converting, which can involve a sintering, heat-treatment, spray-pyrolysis, or combined fluidized bed drying/heating procedure. The step of converting may also comprise a procedure of chemically or thermally reducing the graphene precursor (e.g. GO) to reduce or eliminate oxygen content and other non-carbon elements of the graphene precursor. Most preferably, the final heat treatment or sintering of the precursor to the anode active material is conducted concurrently with the thermal reduction step of graphene precursor (e.g. graphene oxide). Both treatments can be conducted at 500° C.-1,500° C., for instance.

A commonly used chemical method of producing graphene involves producing graphene oxide (GO) or graphene fluoride first, which is then chemically or thermally reduced to graphene. The graphene sheets in the graphene-enhanced particulate typically have an oxygen content less than 25% by weight and can have an oxygen content less than 5% by weight. Most typically, the graphene sheet has an oxygen content in the range of 5% to 25% by weight.

The step of preparing the precursor mixture may comprise: A) dispersing or exposing a laminar graphite material in a fluid of an intercalant and/or an oxidant to obtain a graphite intercalation compound (GIC) or graphite oxide (GO); B) exposing the resulting GIC or GO to a thermal shock at temperature for a period of time sufficient to obtain exfoliated graphite or graphite worms; C) dispersing the exfoliated graphite or graphite worms in a liquid medium containing an acid, an oxidizing agent, and/or an organic solvent at a desired temperature for a duration of time until the exfoliated graphite is converted into a graphene oxide dissolved in the liquid medium to form a graphene solution; D) adding a desired amount of the anode active material precursor material to the graphene solution to form the precursor mixture in a suspension, slurry or paste form.

Alternatively, the step of preparing the precursor mixture comprises: (a) preparing a suspension containing pristine nano graphene platelets (NGPs) dispersed in a liquid medium; (b) adding an acid and/or an oxidizing agent into the suspension at a temperature for a period of time sufficient for obtaining a graphene solution or suspension; and (c) adding a desired amount of an anode active material or precursor in the graphene solution or suspension to form a paste or slurry.

The disclosed process also provides a supercapacitor as described in the foregoing, wherein the anode contains the graphene-enabled hybrid particulates and the cathode contains a carbon or graphite material selected from activated carbon, carbon nanotube, carbon nanofiber, graphene, expanded graphite flake, or a combination thereof and the cathode has a specific surface area from 100 to 3,200 $m^2/g$ measured while the cathode is in a dry state (e.g. without the presence of an electrolyte and prior to being incorporated into a supercapacitor cell).

Preferably, in the supercapacitor, the graphene-enabled hybrid particulates in an electrode are packed together in such a manner that graphene sheets form a three-dimensional network of electron-conducting pathways.

In certain embodiments, the disclosed process provides a supercapacitor comprising an anode, a cathode, a porous separator disposed between the anode and the cathode and an electrolyte in ionic contact with the anode and the cathode, wherein the anode or the cathode contains particles of a niobium-containing composite metal oxide, having a size from 1 nm to 10 μm, wherein the niobium-containing composite metal oxide is selected from the group consisting of $TiNb_2O_7$, $Li_xTiNb_2O_7$ ($0 \leq x \leq 5$), $Li_xM_{(1-y)}Nb_yNb_2O_{(7+\delta)}$ (wherein $0 \leq x \leq 6$, $0 \leq y \leq 1$, $-1 \leq \delta \leq 1$, and M=Ti or Zr), $Ti_xNb_yO_7$ ($0.5 \leq y/x < 2.0$), $TiNb_xO_{(2+5x/2)}$ ($1.9 \leq x < 2.0$), $M_xTi_{(1-2x)}Nb_{(2+x)}O_{(7+\delta)}$ (wherein $0 \leq x \leq 0.2$, $-0.3 \leq \delta \leq 0.3$, and M=a trivalent metal selected from Fe, Ga, Mo, Ta, V, Al, B, and a mixture thereof), $M_xTi_{(2-2x)}Nb_{(10+x)}O_{(29+\delta)}$ (wherein $0 \leq x \leq 0.4$, $-0.3 \leq \delta \leq 0.3$, and M=a trivalent metal selected from Fe, Ga, Mo, Al, B, and a mixture thereof), $M_xTiNb_2O_7$ (x<0.5, and M=B, Na, Mg, Al, Si, S, P, K, Ca, Mo, W, Cr, Mn, Co, Ni, and Fe), $TiNb_{2-x}Ta_xO_y$ ($0 \leq x < 2$, $7 \leq y \leq 10$), $Ti_2Nb_{10-v}Ta_vO_w$ ($0 \leq v < 2$, $27 \leq y \leq 29$), $Li_xTi_{(1-y)}M1_yNb_{(2-z)}M2_zO_{(7+\delta)}$ (wherein $0 \leq x \leq 5$, $0 \leq y \leq 1$, $0 \leq z \leq 2$, $-0.3 \leq \delta \leq 0.3$, M1=Zr, Si, and Sn, and M2=V, Ta, and Bi), P-doped versions thereof, B-doped versions thereof, carbon-coated versions thereof, and combinations thereof.

The disclosed process also provides a supercapacitor electrode comprising multiple graphene-enhanced hybrid particulates, wherein at least one of the hybrid particulates is formed of a single or a plurality of graphene sheets and a single or a plurality of fine primary particles of a niobium-containing composite metal oxide, having a size from 1 nm to 10 μm, and the graphene sheets and the primary particles are mutually bonded or agglomerated into the hybrid particulate containing an exterior graphene sheet or multiple exterior graphene sheets embracing the primary particles, and wherein the hybrid particulate has an electrical conductivity no less than $10^{-4}$ S/cm and the graphene is in an amount of from 0.01% to 30% by weight based on the total weight of graphene and the niobium-containing composite metal oxide combined. Preferably, the niobium-containing composite metal oxide is prelithiated or pre-intercalated with lithium.

In the invented supercapacitor electrode, the niobium-containing composite metal oxide is selected from the group consisting of $TiNb_2O_7$, $Li_xTiNb_2O_7$ ($0 \leq x \leq 5$), $Li_xM_{(1-y)}Nb_yNb_2O_{(7+\delta)}$ (wherein $0 \leq x \leq 6$, $0 \leq y \leq 1$, $-1 \leq \delta \leq 1$, and M=Ti or Zr), $Ti_xNb_yO_7$ ($0.5 \leq y/x < 2.0$), $TiNb_xO_{(2+5x/2)}$ ($1.9 \leq x < 2.0$), $M_xTi_{(1-2x)}Nb_{(2+x)}O_{(7+\delta)}$ (wherein $0 \leq x \leq 0.2$, $-0.3 \leq \delta \leq 0.3$, and M=a trivalent metal selected from Fe, Ga, Mo, Ta, V, Al, B, and a mixture thereof), $M_xTi_{(2-2x)}Nb_{(10+x)}O_{(29+\delta)}$ (wherein $0 \leq x \leq 0.4$, $-0.3 \leq \delta \leq 0.3$, and M=a trivalent metal selected from Fe, Ga, Mo, Al, B, and a mixture thereof), $M_xTiNb_2O_7$ (x<0.5, and M=B, Na, Mg, Al, Si, S, P, K, Ca, Mo, W, Cr, Mn, Co, Ni, and Fe), $TiNb_{2-x}Ta_xO_y$ ($0 \leq x \leq 2$, $7 \leq y \leq 10$), $Ti_2Nb_{10-v}Ta_vO_w$ ($0 \leq v < 2$, $27 \leq y \leq 29$), $Li_xTi_{(1-y)}M1_yNb_{(2-z)}M2_zO_{(7+\delta)}$ (wherein $0 \leq x \leq 5$, $0 \leq y \leq 1$, $0 \leq z \leq 2$, $-0.3 \leq \delta \leq 0.3$, M1=Zr, Si, and Sn, and M2=V, Ta, and Bi), P-doped versions thereof, B-doped versions thereof, carbon-coated versions thereof, and combinations thereof.

DETAILED DESCRIPTION OF PREFERRED EMBODIMENTS

Figure 1A:
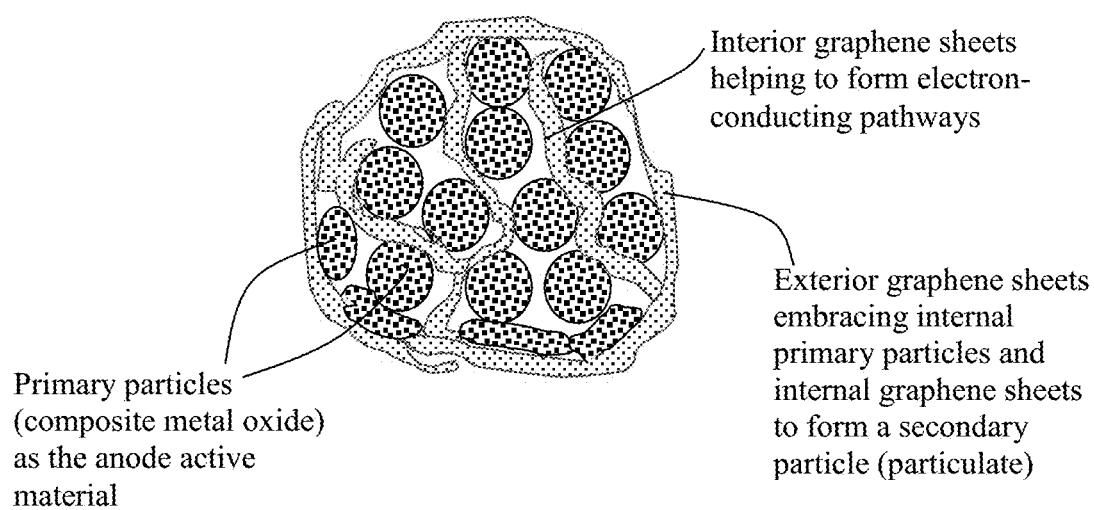
FIG. 1(A) Schematic of a graphene-enhanced hybrid particulate according to a preferred embodiment of the presently disclosed process.

The disclosed process provides a supercapacitor comprising an anode, a cathode, a porous separator disposed between the anode and the cathode and an electrolyte in ionic contact with the anode and the cathode, wherein the anode or the cathode contains graphene-enabled hybrid particulates, wherein at least one of the hybrid particulates is formed of a single or a plurality of graphene sheets and a single or a plurality of fine primary particles of a niobium-containing composite metal oxide, having a size from 1 nm to 10 μm (preferably <1 μm, more preferably <100 nm, and most preferably from 1 to 10 nm), and the graphene sheets and the primary particles are mutually bonded or agglomerated into the hybrid particulate containing an exterior graphene sheet or multiple exterior graphene sheets embracing the primary particles, and wherein the hybrid particulate has an electrical conductivity no less than $10^{-4}$ S/cm and the graphene is in an amount of from 0.01% to 30% by weight based on the total weight of graphene and the niobium-containing composite metal oxide combined.

Preferably, it is the anode (not the cathode) that contains these hybrid particulates as the main active material while the cathode contains a carbon or graphite material having a high specific surface area (from 100 to 3,200 $m^2/g$) as the cathode active material in this supercapacitor. If this anode contains lithium therein (e.g. prelithiated, or pre-loaded or pre-intercalated with lithium prior to first operation of the supercapacitor), such a supercapacitor is a lithium-ion capacitor.

Preferably and typically, the hybrid particulate (e.g. in the anode of a lithium ion capacitor) further contains interior graphene sheets in physical contact with the fine anode active material particles (the primary particles) and the exterior graphene sheet(s). Further preferably, the preparation of the particulates (the secondary particles) is conducted in such a manner that the niobium-containing composite metal oxide nanocrystals are preferentially nucleated from graphene surfaces.

The niobium-containing composite metal oxide is selected from the group consisting of $TiNb_2O_7$, $Li_xTiNb_2O_7$ ($0 \leq x \leq 5$), $Li_xM_{(1-y)}Nb_yNb_2O_{(7+\delta)}$ (wherein $0 \leq x \leq 6$, $0 \leq y \leq 1$, $-1 \leq \delta \leq 1$, and M=Ti or Zr), $Ti_xNb_yO_7$ ($0.5 \leq y/x < 2.0$), $TiNb_xO_{(2+5x/2)}$ ($1.9 \leq x < 2.0$), $M_xTi_{(1-2x)}Nb_{(2+x)}O_{(7+\delta)}$ (wherein $0 \leq x \leq 0.2$, $-0.3 \leq \delta \leq 0.3$, and M=a trivalent metal selected from Fe, Ga, Mo, Ta, V, Al, B, and a mixture thereof), $M_xTi_{(2-2x)}Nb_{(10+x)}O_{(29+\delta)}$ (wherein $0 \leq x \leq 0.4$, $-0.3 \leq \delta \leq 0.3$, and M=a trivalent metal selected from Fe, Ga, Mo, Al, B, and a mixture thereof), $M_xTiNb_2O_7$ (x<0.5, and M=B, Na, Mg, Al, Si, S, P, K, Ca, Mo, W, Cr, Mn, Co, Ni, and Fe), $TiNb_{2-x}Ta_xO_y$ ($0 \leq x < 2$, $7 \leq y \leq 10$), $Ti_2Nb_{10-v}Ta_vO_w$ ($0 \leq v < 2$, $27 \leq y \leq 29$), $Li_xTi_{(1-y)}M1_yNb_{(2-z)}M2_zO_{(7+\delta)}$ (wherein $0 \leq x \leq 5$, $0 \leq y \leq 1$, $0 \leq z \leq 2$, $-0.3 \leq \delta \leq 0.3$, M1=Zr, Si, and Sn, and M2=V, Ta, and Bi), P-doped versions thereof, B-doped versions thereof, carbon-coated versions thereof, and combinations thereof. In such a niobium-containing composite metal oxide, niobium oxide typically forms the main framework or backbone structure, along with at least another transition metal oxide.

As an example, the anode active material comprises a monoclinic complex oxide represented by the formula $Li_xTi_{(1-y)}M1_yNb_{(2-z)}M2_zO_{(7+\delta)}$ (wherein $0 \le x \le 5$, $0 \le y \le 1$, $0 \le z \le 2$, $-0.3 \le \delta \le 0.3$). In the above formula, M1 is at least one element selected from the group consisting of Zr, Si and Sn and M2 is at least one element selected from the group consisting of V, Ta and Bi. Such a monoclinic complex oxide has a lithium intercalation potential of about 1.5 V (vs. $Li^+/Li$) and, thus, enables rapid charge/discharge to be repeated in a stable manner.

Examples of the monoclinic complex oxide represented by the formula $Li_xTi_{(1-y)}M1_yNb_{(2-z)}M2_zO_{(7+\delta)}$ include monoclinic $TiNb_2O_7$. In the crystal structure of monoclinic $TiNb_2O_7$, a metal ion and an oxide ion constitute a skeleton structure. As the metal ion, an Nb ion and a Ti ion are arranged at random in a ratio of Nb:Ti=2:1. The skeleton structures are arranged in 3D alternately and a void exists between the skeleton structures, wherein this void can serve as a host to accommodate lithium ions.

In some portions of the structure, lithium ion can move in two directions: a [100] direction and a [010] direction. These areas function as a two-dimensional channel for lithium ion. In the crystal structure of monoclinic $TiNb_2O_7$, a tunnel exists along a [001] direction. The tunnel can serve as the migration path of lithium ions in a [001] direction. The plane index of the crystal typically has symmetry of space group C2/m.

Thus, the crystal structure of the monoclinic complex oxide has a large space which can be inserted by lithium ions without causing structural instability. Furthermore, the crystal structure of the monoclinic complex oxide has two-dimensional channels enabling rapid diffusion of lithium ions and paths connecting these channels along a [001] direction. Thus, the lithium ion can readily get inserted into and released from the insertion spaces in the crystal structure. Further, the effective space to accommodate the lithium ion is sizable in the crystal structure. These features enable the monoclinic complex oxide to deliver a high lithium storage capacity and high rate performance.

Monoclinic complex oxides represented by the formula $Li_xTi_{(1-y)}M1_yNb_{(2-z)}M2_zO_{(7+\delta)}$ can contain pentavalent cations selected from Nb, V, Ta, and Bi, or tetravalent cations selected from Ti, Zr, Si and Sn.

As another example, the niobium-based composite metal oxide of the present disclosed process may have the formula $Li_xM_{(1-y)}Nb_yNb_2O_{(7+\delta)}$ (wherein $0 \le x \le 6$, $0 \le y \le 1$, $-1 \le \delta \le 1$, and M=Ti or Zr). Examples of such metal oxides include $Li_xTiNb_2O_7$ (TNO), and $Li_xTi_{(1-y)}Nb_yNb_2O_7$ (TNNO), such as and $Li_xTi_{0.9}Nb_{0.1}Nb_2O_7$. Partially replacing Ti with Nb enhances the intrinsic conductivity of the niobium mixed oxide composition. For example, replacing 10% Ti atoms at Ti sites with Nb atoms can transform insulating $TiNb_2O_7$ into conducting $Ti_{0.9}Nb_{0.1}Nb_2O_7$.

A niobium-based composite metal oxide of the present disclosed process may be in the form of particles that may be of variable shape, from needles to disks. These particles may be from one to several hundreds of nanometers in any dimension. The particles may aggregated or not, and aggregates may be nearly spherical or ellipsoidal.

The niobium-based composite metal oxide may be prepared in several different ways. For example, a niobium oxide may be prepared by conventional sol-gel methods or by conventional solid state reactions. In particular, TNO and TNNO may be prepared by sol-gel and solid state techniques.

In the sol-gel technique, TNO may be produced using $Nb_2O_5$, hydrofluoric acid, $Ti(OC_3H_7)_4$, ammonia, and citric acid monohydrate as starting materials. First, $Nb_2O_5$ may be dissolved in hydrofluoric acid to form a transparent solution. In order to remove the F ions from the solution, ammonia may be added to obtain a white $Nb(OH)_5$ precipitate. After the precipitate is washed and dried, the $Nb(OH)_5$ may be dissolved in citric acid to form a Nb(V)-citrate solution. A water-ethanol solution containing $Ti(OC_3H_7)_4$ may be added to this solution while the pH value of the solution is adjusted using ammonia. This final mixture containing Nb(V) and Ti(IV) ions may be stirred at 90° C. to form a citric gel. This gel may then be heated to 140° C. to obtain a precursor. The precursor may be annealed at 900° C. and at 1350° C. to obtain the TNO product.

A TNNO product may be prepared by a solid state reaction, with stoichiometric amounts of the starting materials, $Nb_2O_5$, Nb, and $TiO_2$. The starting materials may be thoroughly ground and pressed into pellets. The pellets may be wrapped in Ta foil, sealed in a vacuum quartz tube, and annealed. The size of the oxide particles may be tailored by the annealing temperature and time. For example, annealing may occur by heating at 900° C., then at 1100° C., with each temperature being maintained for 24 hours to obtain particles in the nanometer size range. Oxides containing lithium (wherein x>0) may be obtained electrochemically upon first discharge.

The niobium-containing composite metal oxide may be in the form of carbon-coated metal oxide particles. The carbon coating may be continuous or discontinuous covering all or a portion of the niobium-based composite oxide. In one embodiment, the amount of the carbon coating, if present, may be up to 5.0% by weight of the coated niobium-based composite metal oxide composition. In certain embodiments, the carbon coating may be present in an amount of 0.1% to 3% by weight of the coated niobium-containing composite metal oxide composition. The presence of a carbon coating enhances the electronic conductivity of the niobium oxide and may help stabilize the Nb(IV) valence state.

A carbon coating, if present, can be formed by known methods and one of skill in the art could readily select an appropriate method to form a desirable carbon coating. In one example, one may mix an organic carbon precursor with the niobium oxide and then pyrolyze the mixture at a temperature within the stability temperature range of the niobium. Such pyrolysis may be carried out under a non-oxidizing atmosphere. The carbon-coated primary particles of a niobium-containing composite metal oxide may then be wrapped around by graphene sheets.

Preferably, graphene sheets include pristine graphene, graphene oxide, reduced graphene oxide, graphene fluoride, graphene chloride, nitrogenated graphene, hydrogenated graphene, doped graphene, or functionalized graphene. Further preferably, graphene sheets include single-layer graphene or few layer graphene (having 2-10 graphene planes). More preferably, the graphene sheets contain 1-5 graphene planes, most preferably 1-3 graphene planes (i.e. single-layer, double-layer, or triple-layer graphene).

In certain embodiments, the disclosed process provides a graphene-enabled hybrid material for use as a supercapacitor anode active material. The hybrid material contains one or a plurality of graphene sheets and a single or a plurality of fine anode active material particles that are bonded to a surface of the graphene sheets; wherein the anode active material particles have a size smaller than 10 µm (preferably <1 µm, more preferably <100 nm, and most preferably <10 nm). Preferably, these particles are nucleated from graphene surfaces and are chemically bonded to graphene surfaces.

Preferably, the niobium-based composite metal oxide particles are in a nanowire, nanotube, nanodisc, nanoribbon, nanobelt, or nanoplatelet form having a diameter or thickness smaller than 100 nm (preferably from 1 nm to 10 nm). Further preferably, the Nb-based composite metal oxide primary, nucleated from and bonded to graphene sheets, are aggregated into secondary particles (particulates) having exterior graphene sheets wrapping around the cluster of primary particles.

Figure 1B:
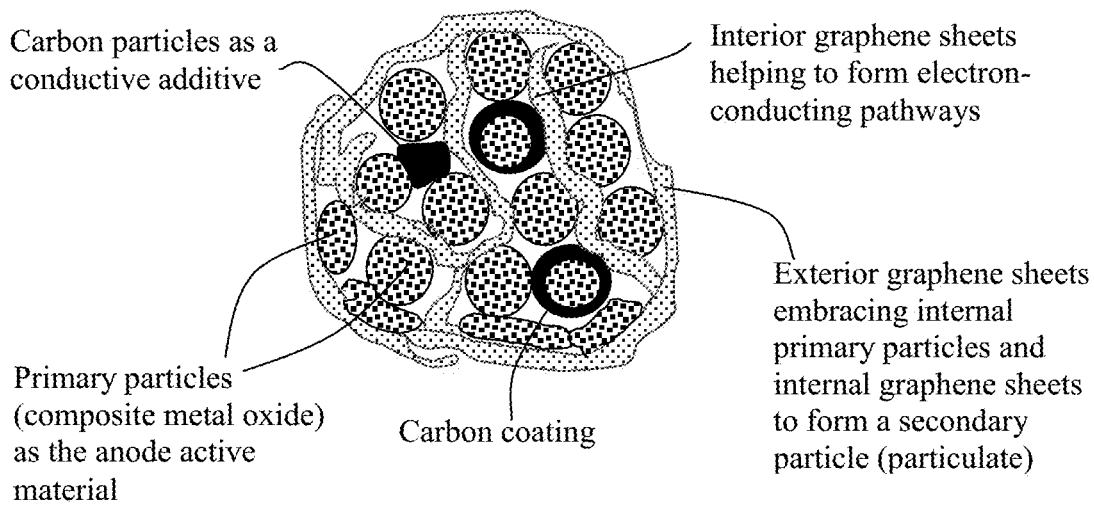
FIG. 1(B) another particulate according to another preferred embodiment of the presently disclosed process (containing some carbon component).

This disclosed process provides a graphene-enhanced particulate for use as a supercapacitor anode active material. As illustrated in FIG. 1(A), the particulate is formed of a single or a plurality of graphene sheets and a plurality of fine anode active material particles (primary particles of a niobium-based composite metal oxide) with a size smaller than 10 μm (preferably and typically smaller than 1 μm, further preferably and typically <100 nm, and most preferably and typically <10 nm). The graphene sheets and the primary particles are mutually bonded or agglomerated into the particulate (also referred to as a secondary particle) with an exterior graphene sheet or multiple graphene sheets embracing the anode active material particles. Some graphene sheets get incorporated into the interior of the particulate (herein referred to as internal or interior graphene sheets), providing additional electron-conducting paths. FIG. 1(B) shows another preferred embodiment, wherein an additional conductive additive (such as carbon black particles, carbon coating, or conducting polymer coating) is incorporated in the particulate.

The resulting particulate typically has an electrical conductivity no less than $10^{-4}$ S/cm (typically and preferably greater than $10^{-2}$ S/cm). The graphene component is in an amount of from 0.01% to 30% by weight (preferably between 0.1% to 20% by weight and more preferably between 0.5% and 10%) based on the total weight of graphene and the anode active material combined. With the processes herein invented, the particulates tend to be approximately spherical or ellipsoidal in shape, which is a desirable feature.

The cathode of the presently invented supercapacitor preferably contains a porous or high surface area carbon or graphite material selected from activated carbon, carbon nanotube, carbon nanofiber, graphene, expanded graphite flake, or a combination thereof and the cathode has a specific surface area from 100 to 3,200 $m^2$/g measured while in a dry state.

A nano graphene platelet (NGP) or graphene sheet is composed of one basal plane (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single layer) to 100 nm (multi-layer). For the present electrode use, the preferred thickness is <10 nm, more preferably <3 nm (or <10 layers), and most preferably single-layer graphene. Thus, the presently invented graphene-enhanced particulate preferably contains mostly single-layer graphene, but could make use of some few-layer graphene (less than 10 layers). The graphene sheet may contain a small amount (typically <25% by weight) of non-carbon elements, such as hydrogen, nitrogen, fluorine, and oxygen, which are attached to an edge or surface of the graphene plane. Graphene was recently discovered to exhibit the highest thermal conductivity of all existing materials. In addition to the electrical conductivity, this high thermal conductivity is clearly an advantageous property that could not be achieved by any other type of conductive additives.

Most significantly, we have found that, under the presently invented processing conditions, graphene sheets serve as preferential heterogeneous nucleation sites that can significantly increase the total number of the niobium composite oxide crystals and decrease the crystal size, most often down to smaller than 10 nm. This surprising feature turns out to be highly beneficial in terms of realizing the full lithium storage capability even at a high charge/discharge rate. Consequently, the resulting hybrid materials, especially when in a graphene-embraced particulate form (the hybrid particulate), exhibit unprecedentedly high power density and cycle stability.

Graphene sheets may be oxidized to various extents during their preparation, resulting in graphite oxide (GO) or graphene oxide. Hence, in the present context, graphene preferably or primarily refers to those graphene sheets containing no or low oxygen content; but, they can include GO of various oxygen contents. Further, graphene may be fluorinated to a controlled extent to obtain graphite fluoride, or can be doped using various dopants, such as boron and nitrogen.

As a preferred embodiment, the process of producing graphene-enhanced particulates comprises (i) preparing a precursor mixture of graphene or graphene precursor (e.g. GO) with an anode active material or a precursor to the anode active material; and (ii) thermally and/or chemically converting the precursor mixture to the graphene-enhanced anode particulate. Described in more detail, as an example, the process entails:

(a) dispersing or immersing a laminar graphite material (e.g., graphite powder) in a mixture of an intercalant and an oxidant (e.g., concentrated sulfuric acid and nitric acid, respectively) to obtain a graphite intercalation compound (GIC) or graphite oxide (GO);

(b) exposing the resulting GIC or GO to a thermal shock, preferably in a temperature range of 600-1,100° C. for a short period of time (typically 15 to 60 seconds), to obtain exfoliated graphite or graphite worms; and (c) dispersing exfoliated graphite in a liquid (e.g. water) and mechanically separating individual nanographene platelets or sheets from graphite worms using, for instance, a high-shear mixer or an ultrasonicator to obtain a graphene or graphene precursor suspension; or, alternatively, (d) re-dispersing the exfoliated graphite to a liquid medium containing an acid (e.g., sulfuric acid), an oxidizing agent (e.g. nitric acid), or an organic solvent (e.g., NMP) at a desired temperature for a duration of time until the exfoliated graphite is converted into graphene oxide or graphene dissolved in the liquid medium. The acid is preferably a weak acid (such as diluted sulfuric acid) or a more environmentally benign acid, such as formic acid, acetic acid, citric acid, carboxylic acid, and combinations thereof. The exfoliated graphite, when dispersed in these acids, was gradually dispersed and essentially dissolved to form a graphene or graphene oxide solution or suspension. Although not a required operation, stirring, mechanical shearing, or ultrasonication can be used to accelerate the dispersion and dissolution step;

(e) dispersing an anode active material or its precursor to the graphene or graphene precursor solution or suspension prepared in step (c) or step (d) to obtain a precursor mixture suspension; and (f) dispensing the precursor mixture to form precursor mixture droplets and thermally and/or chemically converting the droplets into the graphene-enhanced anode particulates.

The carboxylic acid used in step (d) may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_n COOH$, wherein n is a number of from 0 to 5, including formic, acetic, propionic, butyric, pentanoic, and hexanoic acids, anhydrides thereof, reactive carboxylic acid derivatives thereof, and combinations thereof. The most preferred carboxylic acids are formic acid and acetic acid.

In step (e), carbon particles may be added along with the anode active material particles (if the process begins with previously made niobium composite metal oxide particles). Alternatively, the anode active material particles may be coated with a thin layer of carbon before they are mixed with the graphene suspension. For instance, micron-, submicron, or nanoscaled $TiNb_2O_7$ particles may be mixed into a solution containing a carbon precursor (e.g. sugar in water or phenolic resin in a solvent). The liquid component is then removed from the resulting mixture suspension or paste to obtain sugar- or resin-coated $TiNb_2O_7$ particles. These coated particles are then heat-treated at a temperature of 500-1,000° C. to obtain carbon-coated particles. These particles are then added to the graphene solution or suspension.

Typically, graphene-enhanced particulates comprising $TiNb_2O_7$ particles and graphene sheets inside and around the particulate are substantially spherical or ellipsoidal in shape. Graphene sheets embrace and protect the primary particles to form secondary particles (particulates) that are easier to handle in a real cathode production environment. The notion that the exterior particulate surface is encapsulated by highly conductive graphene sheets implies that these sheets can naturally form a 3-D network of electron-conducting paths when multiple particulates are packed together in a cathode.

As another preferred embodiment, the process may begin with the production of a precursor solution or suspension of pristine graphene (non-oxidized graphene) directly from graphite particles, which is followed by the addition of an anode active material or precursor to the anode active material to this solution or suspension to obtain a precursor mixture. The production of a precursor solution or suspension may include the following steps:

(a) preparing a suspension containing pristine nano graphene platelets (NGPs) dispersed in a liquid medium using, for instance, direct ultrasonication (e.g., a process disclosed by us in U.S. patent application Ser. No. 11/800,728 (May 8, 2007) U.S. Patent Pub. No. 2008-0279756);

(b) optionally removing some of the liquid from the suspension;

(c) adding a desired amount of an anode active material or a precursor to an anode active material to obtain a precursor mixture suspension or solution;

(d) removing the liquid from the suspension to obtain a precursor mixture solid; and (e) thermally and/or chemically converting the precursor mixture solid to the graphene-enhanced anode particulate.

For the preparation of an anode electrode, multiple graphene-enhanced particulates are mixed with a binder solution (e.g., PVDF in NMP) to obtain a slurry or paste. A desired amount of the slurry or paste is then coated onto a current collector, allowing the liquid to evaporate and leaving behind an electrode bonded to a surface of a current electrode (e.g. Cu foil). For examples, lithium cobalt oxide particles embraced by graphene sheets may be added to a solution containing a solvent (NMP). The resulting paste may be coated onto a Cu foil as a current collector to form a coating layer of 50-500 μm thick. By allowing the solvent to vaporize one obtains a negative electrode (anode) for a lithium-ion battery.

In the aforementioned examples, the starting material for the preparation of graphene sheets or NGPs is a graphitic material that may be selected from the group consisting of natural graphite, artificial graphite, graphite oxide, graphite fluoride, graphite fiber, carbon fiber, carbon nanofiber, carbon nanotube, mesophase carbon microbead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The un-broken graphite worms or individual graphite flakes are then re-dispersed in water, acid, or organic solvent and ultrasonicated to obtain a graphene polymer solution or suspension.

The pristine graphene material is preferably produced by one of the following three processes: (A) intercalating the graphitic material with a non-oxidizing agent, followed by a thermal or chemical exfoliation treatment in a non-oxidizing environment; (B) subjecting the graphitic material to a supercritical fluid environment for inter-graphene layer penetration and exfoliation; or (C) dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nanoscaled platelets, which are pristine, non-oxidized NGPs.

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The laminar graphite materials used in the prior art processes for the production of the GIC, graphite oxide, and subsequently made exfoliated graphite, flexible graphite sheets, and graphene platelets were, in most cases, natural graphite. However, the present disclosed process is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nanofiber, carbon nanotube, mesophase carbon microbead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

The presently invented process typically resulted in nanographene sheets that, when formed into a thin film with a thickness no greater than 100 nm, exhibits an electrical conductivity of at least 10 S/cm, often higher than 100 S/cm, and, in many cases, higher than 1,000 S/cm. The resulting NGP powder material typically has a specific surface area of from approximately 300 m$^2$/g to 2,600 m$^2$/g and, in many cases, comprises single-layer graphene or few-layer graphene sheets.

When these graphene sheets are combined with anode active material particles to form graphene-enhanced hybrid particulates, these hybrid particulates (when packed into a dry electrode) exhibit an electrical conductivity no less than $10^{-4}$ S/cm (typically and preferably greater than $10^{-2}$ S/cm and most typically and preferably greater than 1 S/cm). The graphene component is in an amount of from 0.01% to 30% by weight (preferably between 0.1% to 20% by weight and more preferably between 0.5% and 10%) based on the total weight of graphene and the anode active material combined. Preferably, the particulates are approximately spherical in shape.

Graphene sheets may be oxidized to various extents during their preparation, resulting in graphite oxide or graphene oxide (GO). Hence, in the present context, graphene preferably or primarily refers to those graphene sheets containing no or low oxygen content; but, they can include GO of various oxygen contents. Further, graphene may be fluorinated to a controlled extent to obtain graphene fluoride.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

Optionally, the particulate further comprises a carbon material in electronic contact with the anode active material and a graphene sheet. This carbon material can be a polymeric carbon, amorphous carbon, chemical vapor deposition (CVD) carbon, carbon black (CB), acetylene black (AB), activated carbon, fine expanded graphite particle with a dimension smaller than 100 nm, artificial graphite particle, and/or natural graphite particle. Preferably, the carbon material is coated on at least one of the anode active material particles and more preferably on the surface of all primary particles, which are then embraced by a graphene sheet or a plurality of graphene sheets.

The present disclosed process also provides a supercapacitor anode comprising the aforementioned multiple graphene-enhanced hybrid particulates. In particular, the disclosed process provides a supercapacitor anode comprising multiple graphene-enhanced hybrid particulates, wherein the multiple particulates are packed together with graphene sheets forming a three-dimensional electron-conducting pathway. The disclosed process also provides a supercapacitor (a lithium-ion capacitor) comprising an anode comprising the aforementioned multiple graphene-enhanced hybrid particulates, a cathode, an electrolyte in physical contact with both the anode and the cathode, and an optional separator disposed between the anode and the cathode.

There is no limitation on the type of cathode active materials that can be used to pair up with the presently invented anode active materials. There is also no limitation on what type of electrolyte and separator that can be used. The electrolyte can be an organic, ionic liquid, polymer gel, solid polymer, quasi-solid, solid state electrolyte, or a combination thereof. The separator can be porous polymer membrane, fibril-based membrane, ceramic-coated membrane, etc.

The cathode of the presently invented supercapacitor preferably contains a porous or high surface area carbon or graphite material selected from activated carbon, carbon nanotube (activated or non-activated), carbon nanofiber (activated or non-activated), graphene (activated or non-activated), expanded graphite flake (activated or non-activated), or a combination thereof and the cathode has a specific surface area from 100 to 3,200 $m^2/g$ measured while in a dry state.

In order to make a pseudo-capacitor (a supercapacitor that works on the development of pseudo-capacitance through redox pair formation), the cathode active material may be designed to contain graphene sheets (or other active materials, such as activated carbon and CNTs) and a redox pair partner material selected from a metal oxide, a conducting polymer (e.g. conjugate-chain polymers), a non-conducting polymer (e.g. polyacrylonitrile, PAN), an organic material (e.g. hydroquinone), a non-graphene carbon material, an inorganic material, or a combination thereof. Many of the materials that can pair up with reduced graphene oxide sheets are well-known in the art. In this study, we have come to realize that graphene halogenide (e.g. graphene fluoride), graphene hydrogenide, and nitrogenated graphene can work with a wide variety of partner materials to form a redox pair for developing pseudo-capacitance.

For instance, the metal oxide or inorganic materials that serve in such a role include $RuO_2$, $IrO_2$, NiO, $MnO_2$, $VO_2$, $V_2O_5$, $V_3O_8$, $TiO_2$, $Cr_2O_3$, $Co_2O_3$, $Co_3O_4$, $PbO_2$, $Ag_2O$, $MoC_x$, $Mo_2N$, or a combination thereof. In general, the inorganic material may be selected from a metal carbide, metal nitride, metal boride, metal dichalcogenide, or a combination thereof. Preferably, the desired metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nanodisc, nanoribbon, or nanoplatelet form. These materials or their precursors can be incorporated in the coating slurry prior to the coating or film forming procedure. Alternatively, their molecular precursors in a liquid solution may be impregnated into the pores of the graphene foam and the precursor is then thermally or chemically converted into the desired inorganic species (e.g. transition metal oxide). The liquid or gel electrolyte is then impregnated into the foam. Any commonly used supercapacitor electrolytes may be used in the presently invented hybrid supercapacitors. However, preferably, the electrolytes contain a lithium salt that is dissolved in a liquid solvent. Lithium salts and liquid solvents are well-known in the art.

The following examples serve to provide the best modes of practice for the present disclosed process and should not be construed as limiting the scope of the invention.

Example 1: Graphene Oxide from Sulfuric Acid Intercalation and Exfoliation of MCMBs MCMB (mesocarbon microbeads) were supplied by China Steel Chemical Co. This material has a density of about 2.24 $g/cm^3$ with a median particle size of about 16 µm. MCMBs (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C.-1,100° C. for 30-90 seconds to obtain graphene samples. A small quantity of graphene was mixed with water and ultrasonicated at 60-W power for 10 minutes to obtain a suspension. A small amount was sampled out, dried, and investigated with TEM, which indicated that most of the NGPs were between 1 and 10 layers. The oxygen content of the graphene powders (GO or RGO) produced was from 0.1% to approximately 25%, depending upon the exfoliation temperature and time.

Example 2: Sol-Gel Process for Producing Graphene-Protected $Li_xTiNb_2O_7$ (TNO)

The GO or RGO sheets produced in Example 1 were then used as heterogeneous nucleation sites for promoting the formation of niobium-based composite metal oxide crystals. The synthesis method of producing graphene-bonded/nucleated nanocrystals involves precipitating the precursor to niobium-based composite metal oxide nanoparticles from a solution reactant mixture of $Nb(OH)_5$ (dissolved in citric acid) and water-ethanol solution containing $Ti(OC_3H_7)_4$, in the presence of GO sheets.

Specifically, $Nb_2O_5$ was dissolved in hydrofluoric acid to form a transparent solution. In order to remove the F ions from the solution, ammonia was added to obtain a white $Nb(OH)_5$ precipitate. After the precipitate was washed and dried, the $Nb(OH)_5$ was dissolved in citric acid to form a Nb(V)-citrate solution. A water-ethanol solution containing $Ti(OC_3H_7)_4$ was added to this solution while the pH value of the solution was adjusted using ammonia. This final mixture containing Nb(V) and Ti(IV) ions, along with GO sheets, was then stirred at 90° C. to form a citric gel. This gel was then heated to 140° C. to obtain a precursor, which was annealed at 900° C. and at 1350° C. to obtain the $Li_xTiNb_2O_7$ (TNO) products nucleated from GO surfaces.

The amount of GO was designed in such a manner that the final graphene proportion in the TNO/graphene hybrid was typically from 0.01% to 30%, but more typically from 0.1% to 10% by weight. The TNO/graphene hybrid primary particles were then dispersed in GO/water dispersion (2% GO) to form a suspension. We observed that GO molecules per se are a good surfactant. The suspension was then spray-dried to obtain graphene-encapsulated TNO/graphene particulates, containing graphene sheets embracing primary particles of TNO/internal graphene sheets.

Example 3: Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 4. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes to obtain a homogeneous graphene-water suspension.

Example 4: Graphene-Protected $TiNb_2O_7$

In one set of experiments, fine particles of composite metal oxide were added to a graphene-water suspension, which was then spray-dried to produce separate samples of particulates containing graphene sheets embracing primary particles and internal graphene sheets. As comparative examples, primary particles of $TiNb_2O_7$ without graphene protection were also prepared.

Titanium dioxide ($TiO_2$) having an anatase structure and niobium pentoxide ($Nb_2O_5$) were mixed (with or without GO sheets), and the mixture was sintered at 1100° C. for 24 hours to obtain a niobium composite oxide having a composition formula $TiNb_2O_7$ (sample A1 and A1-G; the latter having graphene protection).

Next, 150 g of the niobium composite oxide having the composition formula $TiNb_2O_7$ (sample A1) and 5 g of polyethylene glycol were added to 150 g of pure water, and grinding and dispersing procedures were carried out for 12 hours by ball milling using zirconia beads having a diameter of 5 mm, whereby a uniform slurry was prepared. In one sample, GO sheets were added into the slurry. Then, the slurry (with or without GO) was spray-dried in an air atmosphere of 180° C. to obtain secondary particles (sample B1-G and sample B1), which contained primary particles having an average particle diameter of about 0.15 μm (B1-G) and 0.6 μm (B1), respectively. In sample B1 and B1-G, secondary particles (unprotected particulates and graphene-protected particulates) had an average diameter of 10 μm and 7.5 μm, respectively. The obtained particulates were sintered for 3 hours at 900° C. under an air atmosphere to produce sample C1 and C1-G.

Then, 100 g of the sample C1, 3 g of maltose, and 100 g of pure water were put into a beaker, and mixed. The mixture was dispersed with a stirrer using a rotor, and then dried by evaporation to thereby uniformly coat an organic material on the sample. Then, sintering (carbonization heat treatment) was carried out in an inert atmosphere in an argon air current at 700° C. for 1 hour to thereby carbonize the organic material to obtain sample D1. Separately, sample D1 was sintered in an inert atmosphere in an argon air flow at 900° C. for 3 hours to obtain a sample E1. Another set of experiments was conducted by using a spray dryer to synthesize composite metal oxide-graphene hybrids (sample E1-G).

The details about preparation and testing of supercapacitor cells (lithium-ion capacitors) featuring these anode active materials are presented in Example 11. Some testing results (using the Nb-based composite oxide as the working electrode and a Li foil as the counter electrode) are summarized in Table 1 below, which indicates that the approach of forming graphene-wrapped particulates has enabled the lithium battery to exhibit a significantly higher specific capacity. After lithium ions are charged into the Nb-based composite oxide, the resulting prelithiated composite oxide electrode is used as an anode that pairs up with a graphene sheet- or activated carbon-based cathode electrode to make a supercapacitor (more specifically, a lithium-ion capacitor).

TABLE 1

Properties of graphene-protected and un-protected $TiNb_2O_7$ as an anode material, coupled with a sheet of lithium metal foil as the counter-electrode.

| Sample | C coating % | Graphene % | Primary particle diameter (μm) | Initial capacity (mAh/g) |
|---|---|---|---|---|
| A1 | 0 | 0 | 12 | 166 |
| A1-G | 0 | 2.5 | 0.45 | 224 |
| B1 | 0 | 0 | 0.6 | 215 |
| B1-G | 0 | 3.3 | 0.12 | 245 |
| C1 | 0.1 | 0 | 0.6 | 255 |
| C1-G | 0.1 | 3.4 | 0.1 | 276 |
| D1 | 1.1 | 0 | 0.6 | 280 |
| D1-G | 1.1 | 2.4 | 0.085 | 295 |
| E1 | 1.2 | 0 | 0.6 | 254 |
| E1-G | 1.2 | 2.5 | 0.1 | 266 |

Example 5: Preparation of Pristine Graphene-Protected Particulates

Pristine graphene sheets were produced by using the direct ultrasonication or liquid-phase exfoliation process. In a typical procedure, five grams of graphite flakes, ground to approximately 20 μm in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets were pristine graphene that had never been oxidized and were oxygen-free and relatively defect-free. There are no other non-carbon elements. Fine particles of niobium-containing composite metal oxide (prepared in Example 6 below) were added to a graphene-water suspension, which were then spray-dried to produce samples of particulates containing graphene sheets embracing primary particles and internal graphene sheets.

Example 6: Graphene-Protected $TiNb_2O_7$, $TiMoNbO_7$, and $TiFe_{0.3}Nb_{1.7}O_7$ A niobium-titanium composite oxide represented by the general formula $TiNb_2O_7$ was again synthesized, but using a different approach. Commercially available niobium oxide ($Nb_2O_5$) and a titanate proton compound were used as starting materials. The titanate proton compound was prepared by immersing potassium titanate in hydrochloric acid at 25° C. for 72 hours. In the process, 1M hydrochloric acid was replaced with a 1M of fresh acid every 24 hours. As a result, potassium ions were exchanged for protons to obtain the titanate proton compound. The niobium oxide ($Nb_2O_5$) and the titanate proton compound were weighed such that the molar ratio of niobium to titanium in the synthesized compound was 3. The mixture was dispersed in 100 ml of pure water, followed by vigorous mixing. The obtained mixture was placed in a heat resistant container, and was subjected to hydrothermal synthesis under conditions of 180° C. for a total of 24 hours. The obtained sample was washed in pure water three times, and then dried. The sample was then subjected to a heat treatment at 1,100° C. for 24 hours to obtain $TiNb_2O_7$.

Additionally, a niobium-molybdenum-titanium composite oxide was synthesized in the same manner as above except that niobium oxide ($Nb_2O_5$), molybdenum oxide ($Mo_2O_5$), and a titanate proton compound were weighed such that the molar ratio of niobium to titanium and that of molybdenum to titanium in the synthesized compound was 1.5 and 1.5, respectively. As a result, a niobium-molybdenum-titanium composite oxide ($TiMoNbO_7$) was obtained.

In addition, a niobium-Iron-titanium composite oxide was synthesized in the same manner as above except that niobium oxide ($Nb_2O_5$), a titanate proton compound, and iron oxide ($Fe_2O_3$) were weighed such that the molar ratio of niobium to titanium and of iron to titanium in the synthesized compound was 3 and 0.3, respectively. As a result, a niobium-titanium composite oxide ($TiFe_{0.3}Nb_{1.7}O_7$) was obtained.

The above niobium-containing composite metal oxide powders ($TiNb_2O_7$, $TiMoNbO_7$, and $TiFe_{0.3}Nb_{1.7}O_7$) were separately added into a dispersion containing pristine graphene sheets, a dispersion agent, and water obtained in Example 5 to form a suspension. The suspensions were then separately spray-dried to produce samples of particulates containing graphene sheets embracing primary particles and internal graphene sheets.

Example 7: Preparation of Graphene Fluoride (GF)-Protected Particulates

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). A pre-cooled Teflon reactor was filled with 20-30 mL of liquid pre-cooled $ClF_3$, and then the reactor was closed and cooled to liquid nitrogen temperature. Subsequently, no more than 1 g of HEG was put in a container with holes for $ClF_3$ gas to access the reactor. After 7-10 days, a gray-beige product with approximate formula $C_2F$ was formed. GF sheets were then dispersed in halogenated solvents to form suspensions. Fine particles of niobium-containing composite metal oxide (prepared in Example 8 below) were separately added to GF-solvent suspensions, which were then spray-dried to produce separate samples of particulates containing graphene sheets embracing primary particles and internal graphene sheets.

Example 8: Graphene-Protected $Ga_{0.1}Ti_{0.8}Nb_{2.1}O_7$

In an experiment, 0.125 g of $GaCl_3$ and 4.025 g of $NbCl_5$ were dissolved in 10 mL of anhydrous ethanol under an inert atmosphere (argon) and magnetic stirring. The solution was transferred under air. Then, added to this solution was 6.052 g solution of titanium oxysulfate ($TiOSO_4$) at 15% by mass in sulfuric acid, followed by 10 mL of ethanol to dissolve the precursors under a magnetic stirring. The pH of the solution was adjusted to 10 by slow addition of ammonia $NH_3$ at 28% by mass into water.

The paste was transferred into a Teflon container having a 90-mL capacity, which was then placed in an autoclave. The paste was then heated up to 220° C. for 5 hours with a heating and cooling ramp of 2 and 5 degree C./min, respectively. The paste was then washed with distilled water by centrifugation until a pH between 6 and 7 was obtained. The resulting compound was heated at 60° C. for 12 hours and then ball-milled for 30 min at 500 rpm (revolutions per minute) in hexane. After evaporation of the solvent, the powder was calcinated at 950° C. for 1 hour with a heating/cooling ramp of 3 degree C./min to produce crystals of $Ga_{0.1}Ti_{0.8}Nb_{2.1}O_7$.

Example 9: Graphene-Protected $Fe_{0.1}Ti_{0.8}Nb_{2.1}O_7$

In a representative procedure, 0.116 g of $FeCl_3$ and 4.025 g of $NbCl_5$ were dissolved in 10 mL of anhydrous ethanol under an inert atmosphere (argon) and magnetic stirring. The resulting solution was transferred under air. Then, added to this solution was 6.052 g of titanium oxysulfate ($TiOSO_4$) at 15% by mass in sulfuric acid and 10 mL of ethanol to dissolve the precursors under a magnetic stirring. The pH of the solution was adjusted to 10 by slow addition of ammonia $NH_3$ at 28% by mass into water.

The paste was transferred into a Teflon container having a 90-mL capacity, which was then placed in an autoclave. The paste was then heated up to 220° C. for 5 hours with a heating and cooling ramp of 2 and 5 degree C./min, respectively. The paste was then washed with distilled water by centrifugation until a pH between 6 and 7 was obtained. The compound was heated at 60° C. for 12 hours and then ball-milled for 30 min at 500 rpm in hexane. After evaporation of hexane, the powder was calcinated at 950° C. for 1 hour with a heating/cooling ramp of 3 degree C./min to obtain $Fe_{0.1}Ti_{0.8}Nb_{2.1}O_7$ crystals. These crystals were further processed in Example 10 below for production of nitrogenated graphene-protected composite metal oxide particulates.

Example 10: Preparation of Nitrogenated Graphene-Protected Composite Metal Oxide Particulates Graphene oxide (GO), synthesized in Example 2, was finely ground with different proportions of urea and the pelletized mixture heated in a microwave reactor (900 W)

for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water.

Powder of $Fe_{0.1}Ti_{0.8}Nb_{2.1}O_7$ crystals was dispersed into the above dispersion of nitrogenated graphene sheets to obtain a suspension. The suspension was then spray-dried to produce samples of particulates containing graphene sheets embracing primary particles and internal graphene sheets.

Example 11: Preparation of Electrodes and Electrochemical Testing of Lithium-Ion Capacitors Containing a Graphene-Protected Particulate Anode Several "dry" electrodes (without impregnation of liquid electrolyte) containing graphene-enhanced particulates were prepared by mixing the particulates with a liquid to form a paste without using a binder such as PVDF. The paste was cast onto a surface of a piece of glass, with the liquid medium removed to obtain a dry electrode. Another dry electrode was prepared by directly mixing composite metal oxide primary particles with graphene sheets in an identical liquid to form a paste without using a binder. Again, the paste was then cast to form a dry electrode. The dry electrodes were for the evaluation of the effect of various conductive additives and/or protective materials on the electrical conductivity of an electrode.

For comparison purposes, several additional dry electrodes were prepared under exactly identical conditions, and the paste in each case was made to contain the same anode active particles, but a comparable amount of other conductive additives: multi-walled carbon nanotubes (CNTs), carbon black (Super-P from Timcal), a CNT/Super-P mixture at an 1/1 ratio, and a GO/Super-P mixture at an 1/1 ratio. The electrical conductivity of various dry electrodes was measured and plotted as a function of the weight % of the additive in FIG. 2(A) and FIG. 2(B).

Corresponding "wet" electrodes for incorporation in a battery cell were made to contain a PVDF binder. These electrodes were made into coin cells each containing lithium metal as a counter electrode to evaluate the achievable specific capacity of the particulates when served as an anode active material for a lithium-ion capacitor. These electrodes in the fully lithiated state or charged state were then used as an anode electrode that was coupled with a graphene- or activated carbon-based electrode (cathode) to form a lithium-ion capacitor.

For electrochemical testing, both pouch cells and coin cells were prepared. For the pouch cells, the working electrodes were prepared by mixing 85 wt % active material (e.g. graphene-protected particulates and composite metal oxide primary particles only, separately), 7 wt. % acetylene black (Super-P), and 8 wt % polyvinylidene fluoride binder resin (PVDF, 5 wt. % solid content) dissolved in N-methyl-2-pyrrolidinoe (NMP). After coating the slurries on a sheet of carbon fiber mat, the electrodes were dried at 120° C. in vacuum for 2 h to remove the solvent before pressing. A variety of cathode active materials were used in preparing the pouch cells (full cells).

The capacity was measured with galvanostatic experiments using an Arbin SCTS electrochemical testing instrument. Cyclic voltammetry (CV), at a scanning rate of 1 mV/s, and electrochemical impedance spectroscopy (EIS) were conducted on an electrochemical workstation (CHI 660 System, USA).

Galvanostatic charge/discharge tests were conducted on the samples to evaluate the electrochemical performance. For the galvanostatic tests, the specific capacity (q) is calculated as $$q=I*t/m \qquad (1)$$

where I is the constant current in mA, t is the time in hours, and m is the cathode active material mass in grams. With voltage V, the specific energy (E) is calculated as, $$E=\int Vdq \qquad (2)$$

The specific power (P) can be calculated as $$P=(E/t)(W/kg) \qquad (3)$$

where t is the total charge or discharge step time in hours. The specific capacitance (C) of the cell is represented by the slope at each point of the voltage vs. specific capacity plot, $$C=dq/dV \qquad (4)$$

For each sample, several current density (representing charge/discharge rates) were imposed to determine the electrochemical responses, allowing for calculations of energy density and power density values required of the construction of a Ragone plot (power density vs. energy density).

Figure 2A:
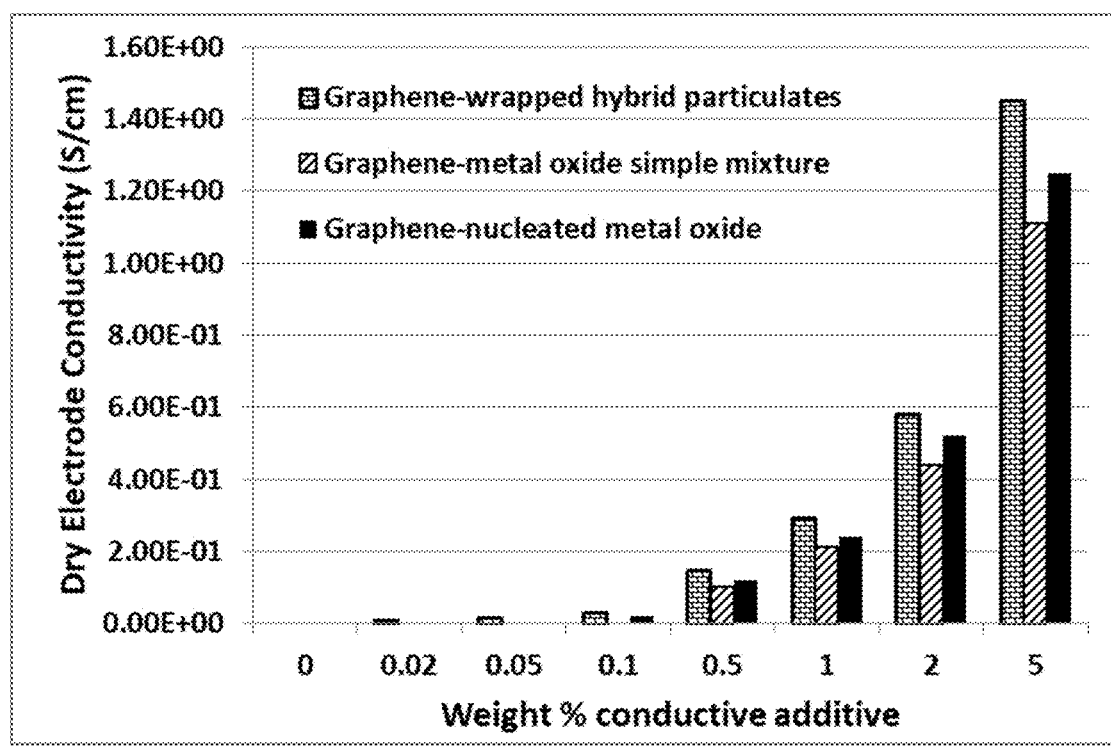
FIG. 2(A) Electrical conductivity data of three dry electrodes, one containing presently invented graphene-enhanced hybrid particulates of niobium-based composite metal oxide particles and graphene sheets, another containing a blend of niobium-based composite metal oxide particles and graphene sheets obtained by simple mixing of these two components, and the third containing niobium-based composite metal oxide nanocrystals nucleated from graphene surfaces (but not in a particulate form where external graphene sheets wrap around internal primary particles)

FIG. 2(A) clearly demonstrates that graphene sheets embracing the primary particles of an anode active material help the electrode achieve a state of percolation (characterized by the formation of a 3-D network of electron-conducting paths) at a weight % as low as 0.02%, as opposed to the percolation threshold of 0.5% by weight for a dry electrode containing primary particles simply mixed with graphene. The performance of the sample containing graphene surface-nucleated $TiNb_2O_7$ particles is better than that of the simple mixture, but lower than that of the hybrid particulate sample. The anode featuring the presently invented hybrid particulates surprisingly delivers the best conductivity characteristics and the best energy density and power density values as well.

Figure 2B:
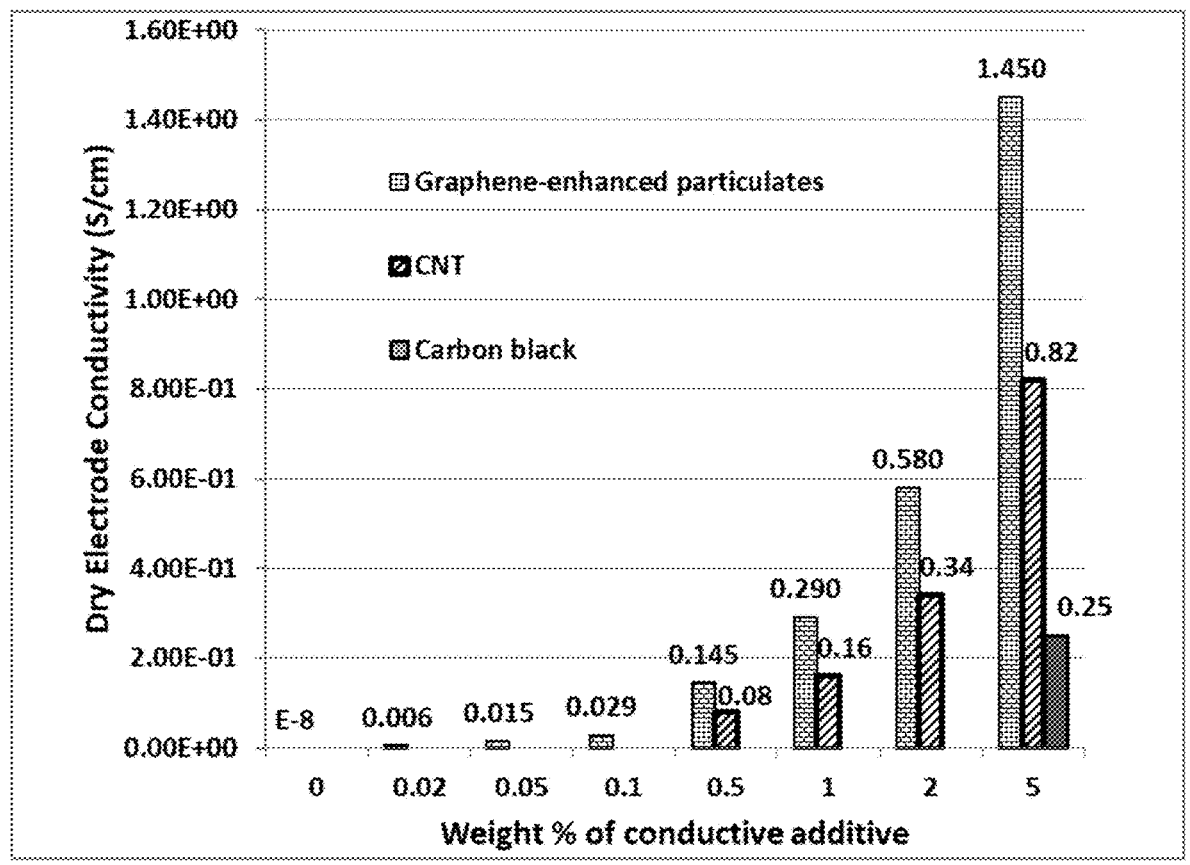
FIG. 2(B) Electrical conductivity data of three dry electrodes, one containing presently invented graphene-enhanced hybrid particulates of niobium-based composite metal oxide and graphene sheets, the second CNTs, and the third carbon black (Super-P from Timcal).

FIG. 2(B) shows that graphene sheets, when incorporated to form graphene-enhanced hybrid particulates of the present disclosed process, provide exceptional electrical conductivity characteristics to the electrodes in terms of a much lower percolation threshold and higher electrical conductivity at a given weight % of additive as compared to the corresponding CNT-enhanced or carbon black-enhanced electrodes. The CB particles (Super-P) did not reach the point of percolation until about 3% by weight. Even at the same weight %, the graphene-enhanced particulates appear to provide higher conductivity to the electrode. These conductivity data clearly demonstrate that the graphene-enhanced particulate approach is a superior strategy for significantly improving the performance of a lithium battery electrode.

Figure 3:
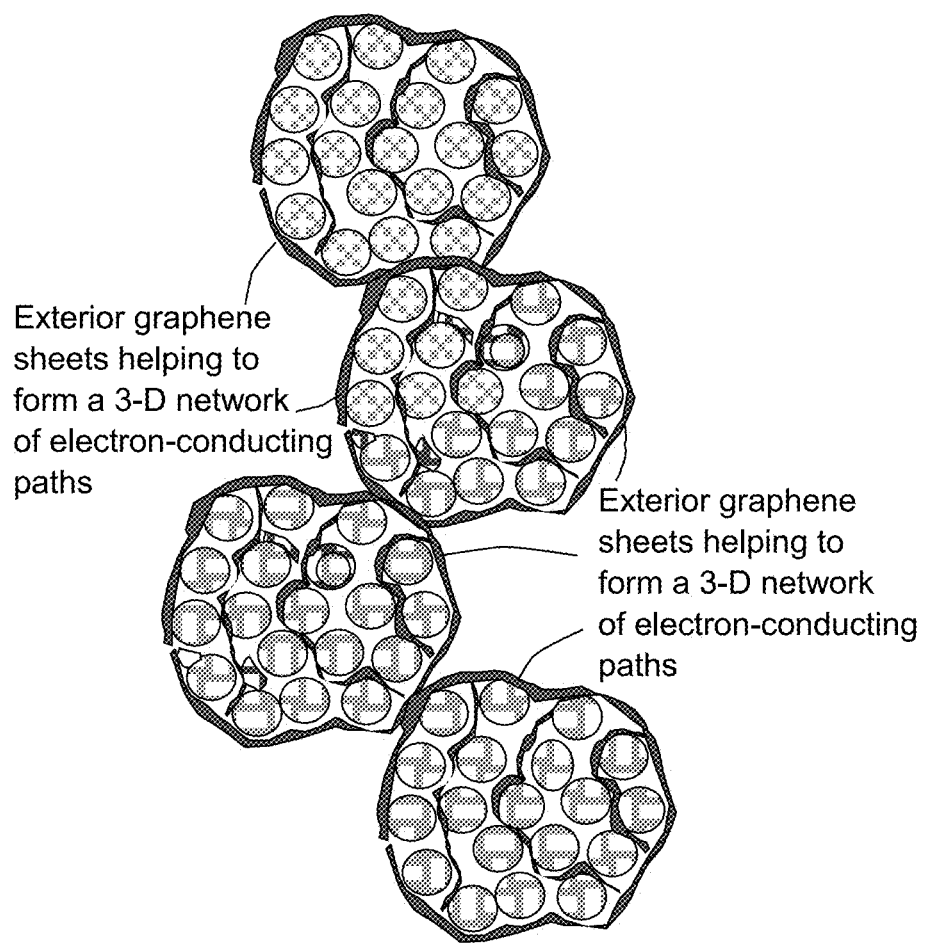
FIG. 3 A schematic drawing illustrating that the graphene sheets disposed on the exterior surface of the particulates naturally form a 3-D network of electron-conducting paths when these hybrid particulates are packed together to form an electrode.

Not wishing to be limited by theory, but we feel that these surprising results on conductivity might be partially due to the high electrical conductivity of graphene and, more importantly, the two-dimensional geometric nature of graphene sheets. As illustrated in FIG. 3, the graphene sheets disposed on the exterior surface of the particulates naturally form a three dimensional network of electron-conducting paths when these particulates are packed together to form an electrode. This geometry-enabled advantage could not be achieved with carbon nanotubes (one dimensional nanoparticles) and carbon black (essentially zero dimensional nanoparticles).

Figure 4:
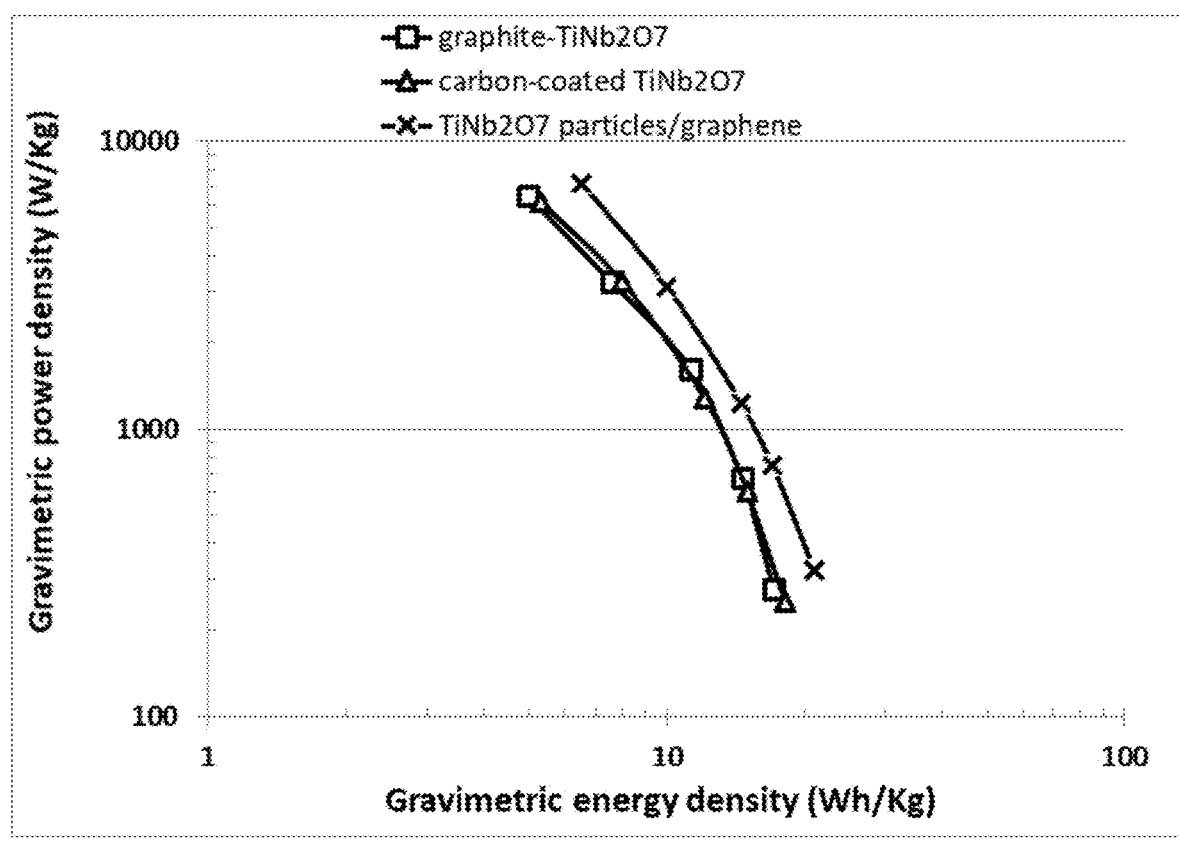
FIG. 4 The Ragone plots (power density vs. energy density) of 3 hybrid supercapacitor cells (lithium-ion capacitors): one containing an anode of graphene-enhanced hybrid particulates of $TiNb_2O_7$ particles/graphene, a cell containing an anode of carbon-coated $TiNb_2O_7$ nanocrystals, and a cell containing ball-milled graphite-$TiNb_2O_7$, each plotted as a function of the number of charge/discharge cycles.

Shown in FIG. 4 are the Ragone plots (power density vs. energy density) of 3 lithium-ion capacitors (all featuring an activated carbon cathode for electric double layers of charges): one containing an anode of graphene-wrapped particulates of $TiNb_2O_7$ particles/graphene, a cell containing an anode of carbon-coated $TiNb_2O_7$ nanocrystals, and a cell containing ball-milled graphite-$TiNb_2O_7$ particles. Graphene-wrapped particulates provide the highest power density and highest energy density among the 3 cells. We have also observed that the latter two lithium-ion capacitor cells featuring carbon-coated $TiNb_2O_7$ nanocrystals and ball-milled graphite-$TiNb_2O_7$ particles, respectively, as the anode active material exhibited a gassing phenomenon, as reflected by the gradually swollen pouch. This was likely due to the electrochemical reduction of the liquid electrolyte catalyzed by Ti or Nb which were exposed to the electrolyte. Graphene sheets wrapped around these anode particles were capable of preventing direct contact between electrolyte and the catalytic transition metal elements, such as Ti and Nb.

Figure 5:
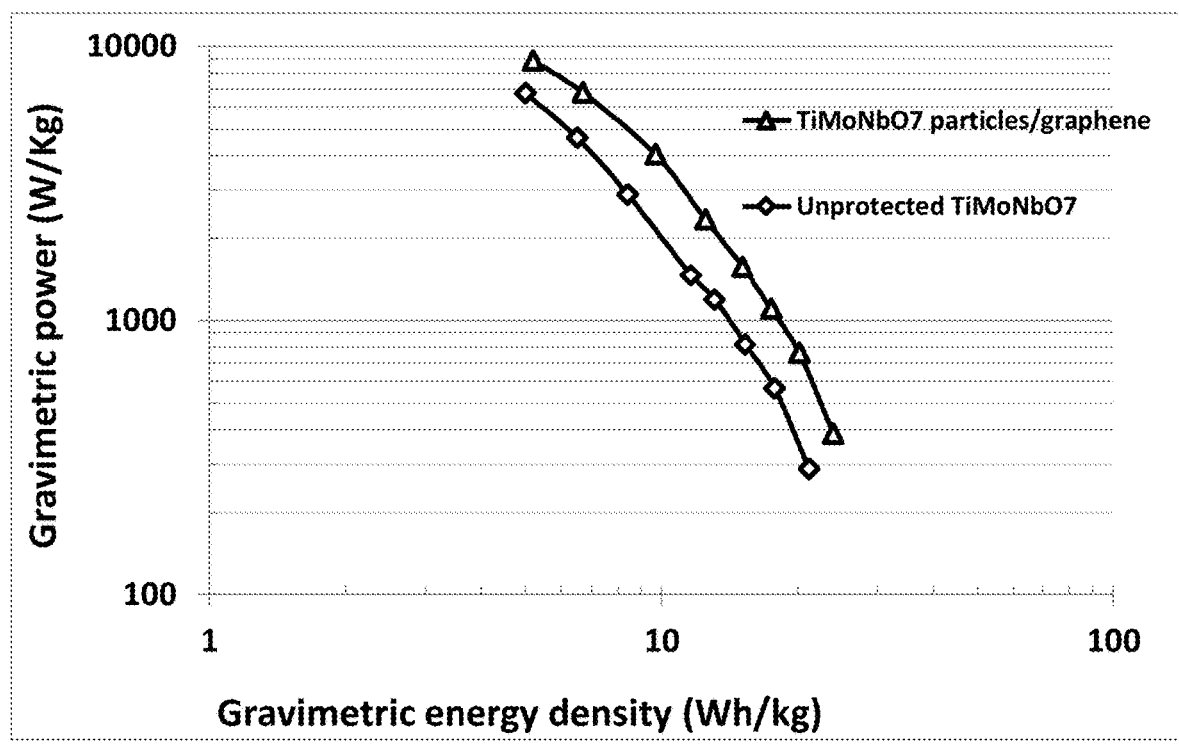
FIG. 5 The Ragone plots (power density vs. energy density) of 2 cells: a cell containing an anode of graphene-enhanced hybrid particulates of $TiMoNbO_7$ particles/graphene and a cell containing non-protected $TiMoNbO_7$ particles, each plotted as a function of the number of charge/discharge cycles.

FIG. 5 shows the Ragone plots (power density vs. energy density) of 2 lithium ion capacitor cells: a cell containing an anode of graphene-enhanced particulates of $TiMoNbO_7$ particles/graphene and a cell containing non-protected $TiMoNbO_7$ particles, each having a graphene sheet-based electric double layer cathode. These data again show the outstanding energy density and power density afforded to by the presently invented graphene-protected hybrid particulate approach.

Figure 6:
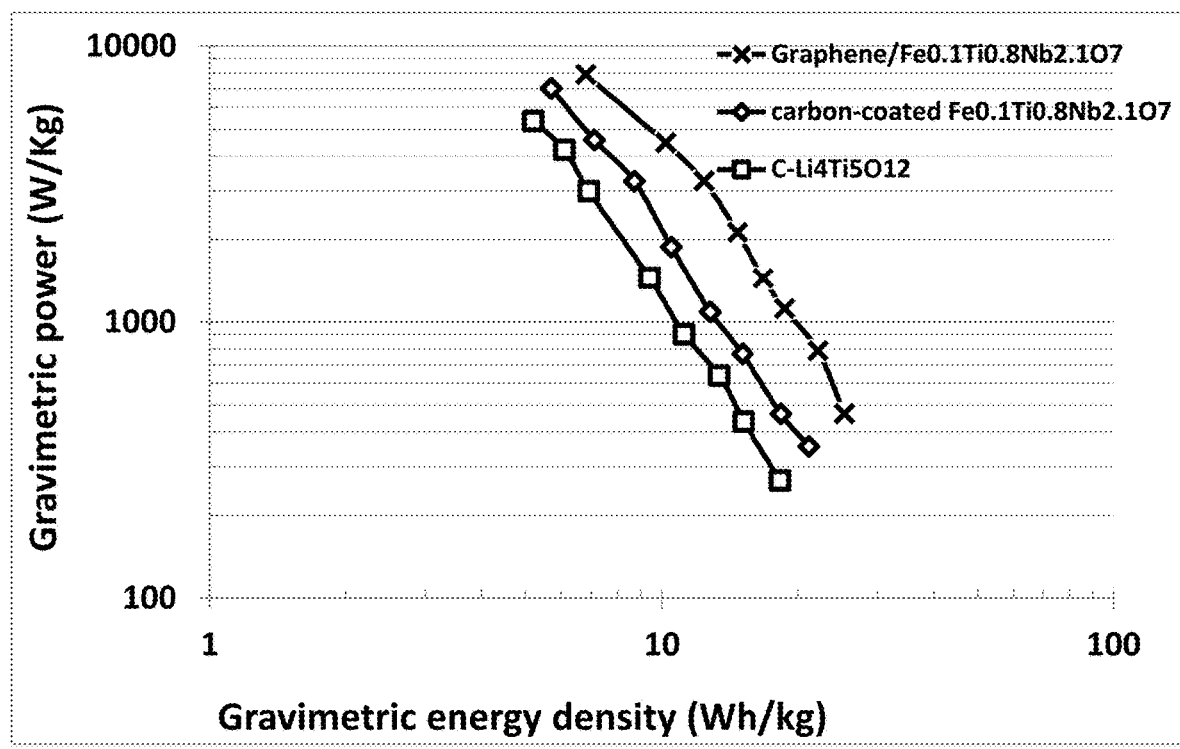
FIG. 6 The Ragone plots (power density vs. energy density) of three cells: a cell containing an anode of graphene-enhanced hybrid particulates of $Fe_{0.1}Ti_{0.8}Nb_{2.1}O_7$, a cell containing an anode of carbon-coated $Fe_{0.1}Ti_{0.8}Nb_{2.1}O_7$, and a cell containing an anode of carbon-coated $Li_4Ti_5O_{12}$.

Summarized in FIG. 6 are the Ragone plots of three cells: a cell containing an anode of graphene-enhanced hybrid particulates of $Fe_{0.1}Ti_{0.8}Nb_{2.1}O_7$, a cell containing an anode of carbon-coated $Fe_{0.1}Ti_{0.8}Nb_{2.1}O_7$, and a cell containing an anode of carbon-coated $Li_4Ti_5O_{12}$. All cells contain a graphene-based electrical double layer charge (EDLC) type of cathode. These anode materials all intercalate lithium ions at an electrochemical potential of 1.1-1.5 V relative to $Li^+/Li$ and, thus, are all capable of stable charging/discharging. However, we have observed that these materials, without graphene wrapping, tend to exhibit a gas-forming phenomenon during repeated charges/discharges, as reflected by the swelling or bulging of the pouch cell. This is presumably caused by repeated electrochemical reduction of the electrolyte, resulting in the formation of volatile gas molecules as a by-product of such side reactions. The presently invented graphene protection approach not only surprisingly overcomes this problem (leading to significantly longer cycle life), but also enables the cell to deliver excellent energy density and power density given the same types of anode and cathode active materials.

The invention claimed is:

1. A supercapacitor comprising an anode, a cathode, a porous separator disposed between the anode and the cathode and an electrolyte in ionic contact with the anode and the cathode, wherein the anode or the cathode contains graphene-enabled hybrid particulates, wherein at least one of said hybrid particulates is formed of at least one graphene sheet and at least one primary particles of a niobium-containing composite metal oxide, having a size from 1 nm to 10 μm, said at least one graphene sheet contains at least one exterior graphene sheet, and the at least one graphene sheet and the at least one primary particle are mutually bonded or agglomerated into said hybrid particulate containing said at least one exterior graphene sheets embracing said at least one primary particle, and wherein said hybrid particulate has an electrical conductivity greater than $10^{-4}$ S/cm and said at least one graphene sheet is in an amount of from 0.01% to 30% by weight based on the total weight of said at least one graphene sheet and the niobium-containing composite metal oxide combined.

2. The supercapacitor of claim 1 wherein said niobium-containing composite metal oxide is selected from the group consisting of $TiNb_2O_7$, $Li_xTiNb_2O_7$ (0≤x≤5), $Li_xM_{(1-y)}Nb_yNb_2O_{(7+\delta)}$ (wherein 0≤x≤6, 0≤y≤1, −1≤δ≤1, and M=Ti or Zr), $Ti_xNb_yO_7$ (0.5≤y/x<2.0), $TiNb_xO_{(2+5x/2)}$ (1.9≤x≤2.0), $M_xTi_{(1-2x)}Nb_{(2+x)}O_{(7+\delta)}$(wherein 0≤x≤0.2, −0.3≤δ≤0.3, and M=a trivalent metal selected from Fe, Ga, Mo, Ta, V, Al, B, and a mixture thereof), $M_xTi_{(2-2x)}Nb_{(10+x)}O_{(29+\delta)}$(wherein 0≤x≤0.4, −0.3≤δ≤0.3, and M=a trivalent metal selected from Fe, Ga, Mo, Al, B, and a mixture thereof), $M_xTiNb_2O_7$ (x<0.5, and M=B, Na, Mg, Al, Si, S, P, K, Ca, Mo, W, Cr, Mn, Co, Ni, and Fe), $TiNb_{2-x}Ta_xO_y$ (0≤x<2, 7≤y≤10), $Ti_2Nb_{10-v}Ta_vO_w$ (0≤v<2, 27≤y≤29), $Li_xTi_{(1-y)}M1_yNb_{(2-z)}M2_zO_{(7+\delta)}$(wherein 0≤x≤5, 0≤y≤1, 0≤z≤2, −0.3≤δ≤0.3, M1=Zr, Si, and Sn, and M2=V, Ta, and Bi), P-doped versions thereof, B-doped versions thereof, carbon-coated versions thereof, and combinations thereof.

3. The supercapacitor of claim 1 wherein said at least one graphene sheet further contains at least one interior graphene sheet, and said hybrid particulate further contains said at least one interior graphene sheet in physical contact with said at least one primary particle and said at least one exterior graphene sheet.

4. The supercapacitor of claim 1 wherein said niobium-containing composite metal oxide is pre-lithiated or pre-intercalated with lithium.

5. The supercapacitor of claim 1 wherein the graphene amount is from 0.1% to 10% by weight of the total weight of graphene and the niobium-containing composite metal oxide combined.

6. The supercapacitor of claim 1 wherein said hybrid particulate has an electrical conductivity from $10^{-2}$ S/cm to 1 S/cm, when measured packed into a dry electrode.

7. The supercapacitor of claim 1 wherein said hybrid particulate is substantially spherical in shape.

8. The supercapacitor of claim 1 wherein said graphene comprises single-layer graphene or few-layer graphene, wherein said few-layer graphene is defined as a graphene platelet formed of less than 10 graphene planes.

9. The supercapacitor of claim 1 wherein said graphene is selected from pristine graphene, graphene oxide, reduced graphene oxide, graphene fluoride, graphene chloride, nitrogenated graphene, hydrogenated graphene, doped graphene, or functionalized graphene.

10. The supercapacitor of claim 1, wherein said primary particles in said hybrid particulate have an average dimension from 10 nm to 1 μm.

11. The supercapacitor of claim 1, wherein said hybrid particulates have an average dimension from 100 nm to 100 μm.

12. The supercapacitor of claim 1, wherein said primary particles of niobium-containing composite metal oxide in a nanowire, nanotube, nanodisc, nanoribbon, nanobelt, or nanoplatelet form have a diameter or thickness smaller than 100 nm.

13. The supercapacitor of claim 1, wherein said primary particles of niobium-containing composite metal oxide in a nanowire, nanotube, nanodisc, nanoribbon, nanobelt, or nanoplatelet form have a diameter or thickness smaller than 10 nm.

14. The supercapacitor of claim 1, further comprising a carbon material in electronic contact with said primary particles and a graphene sheet.

15. The supercapacitor of claim 1, further comprising a carbon material coated on at least one of said primary particles, wherein said carbon material is selected from polymeric carbon, amorphous carbon, chemical vapor deposition carbon, carbon black, acetylene black, activated carbon, fine expanded graphite particle with a dimension smaller than 100 nm, artificial graphite particle, natural graphite particle, or a combination thereof.

16. The supercapacitor of claim 1, wherein said anode contains said graphene-enabled hybrid particulates and said cathode contains a carbon or graphite material selected from activated carbon, carbon nanotube, carbon nanofiber, graphene, expanded graphite flake, or a combination thereof and said cathode has a specific surface area from 100 $m^2/g$ to 3,200 $m^2/g$ measured while in a dry state.

17. The supercapacitor of claim 1, wherein said graphene-enabled hybrid particulates are packed together in such a manner that graphene sheets form a three-dimensional network of electron-conducting pathways.

18. A supercapacitor electrode comprising multiple graphene-enhanced hybrid particulates, wherein at least one of said hybrid particulates is formed of at least one graphene sheet and at least one primary particles of a niobium-containing composite metal oxide, having a size from 1 nm to 10 μm, said at least one graphene sheet contains at least one exterior graphene sheet, and the at least one graphene sheet and the at least one primary particle are mutually bonded or agglomerated into said hybrid particulate containing said at least one exterior graphene sheet embracing said at least one primary particle, and wherein said hybrid particulate has an electrical conductivity greater than $10^{-4}$ S/cm and said at least one graphene sheet is in an amount of from 0.01% to 30% by weight based on the total weight of said at least one graphene sheet and the niobium-containing composite metal oxide combined.

19. The supercapacitor electrode of claim 18, wherein said niobium-containing composite metal oxide is prelithiated or preintercalated with lithium.

20. The supercapacitor electrode of claim 19, wherein said niobium-containing composite metal oxide is selected from the group consisting of $TiNb_2O_7$, $Li_xTiNb_2O_7$ ($0 \leq x \leq 5$), $Li_xM_{(1-y)}Nb_yNb_2O_{(7+\delta)}$ (wherein $0 \leq x \leq 6$, $0 \leq y \leq 1$, $-1 \leq \delta \leq 1$, and M=Ti or Zr), $Ti_xNb_yO_7$ ($0.5 \leq y/x < 2.0$), $TiNb_xO_{(2+5x/2)}$ ($1.9 \leq x \leq 2.0$), $M_xTi_{(1-2x)}Nb_{(2+x)}O_{(7+\delta)}$(wherein $0 \leq x \leq 0x \leq 0.2$, $-0.3 \leq \delta \leq 0.3$, and M=a trivalent metal selected from Fe, Ga, Mo, Ta, V, Al, B, and a mixture thereof), $M_xTi_{(2-2x)}Nb_{(10+x)}O_{(29+\delta)}$(wherein $0 \leq x \leq 0.4$, $-0.3 \leq \delta \leq 0.3$, and M=a trivalent metal selected from Fe, Ga, Mo, Al, B, and a mixture thereof), $M_xTiNb_2O_7$ ($x<0.5$, and M=B, Na, Mg, Al, Si, S, P, K, Ca, Mo, W, Cr, Mn, Co, Ni, and Fe), $TiNb_{2-x}Ta_xO_y$ ($0 \leq x < 2$, $7 \leq y \leq 10$), $Ti_2Nb_{10-v}Ta_vO_w$ ($0 \leq v < 2$, $27 \leq y \leq 29$), $Li_xTi_{(1-y)}M1_yNb_{(2-z)}M2_zO_{(7+\delta)}$(wherein $0 \leq x \leq 5$, $0 \leq y \leq 1$, $0 \leq z \leq 2$, $-0.3 \leq \delta \leq 0.3$, M1=Zr, Si, and Sn, and M2=V, Ta, and Bi), P-doped versions thereof, B-doped versions thereof, carbon-coated versions thereof, and combinations thereof.

\* \* \* \* \*